(12) United States Patent
Liu et al.

(10) Patent No.: US 11,748,603 B2
(45) Date of Patent: *Sep. 5, 2023

(54) INTEGRATED CIRCUIT CHIP DEVICE

(71) Applicant: CAMBRICON TECHNOLOGIES CORPORATION LIMITED, Beijing (CN)

(72) Inventors: Shaoli Liu, Beijing (CN); Xinkai Song, Beijing (CN); Bingrui Wang, Beijing (CN); Yao Zhang, Beijing (CN); Shuai Hu, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 313 days.

This patent is subject to a terminal disclaimer.

(21) Appl. No.: 17/134,446

(22) Filed: Dec. 27, 2020

(65) Prior Publication Data
US 2021/0117765 A1    Apr. 22, 2021

Related U.S. Application Data

(63) Continuation of application No. 16/903,304, filed on Jun. 16, 2020, now Pat. No. 11,544,546, which is a
(Continued)

(30) Foreign Application Priority Data

| Dec. 27, 2017 | (CN) | 201711455388.4 |
| Dec. 27, 2017 | (CN) | 201711455397.3 |
| Dec. 28, 2017 | (CN) | 201711466943.3 |
| Dec. 28, 2017 | (CN) | 201711468629.9 |
| Dec. 28, 2017 | (CN) | 201711469408.3 |

(Continued)

(51) Int. Cl.
*G06N 3/063* (2023.01)
*G06N 3/04* (2023.01)

(52) U.S. Cl.
CPC .............. *G06N 3/063* (2013.01); *G06N 3/04* (2013.01)

(58) Field of Classification Search
CPC ....................................................... G06N 3/063
See application file for complete search history.

(56) References Cited

U.S. PATENT DOCUMENTS 9,779,786 B1    10/2017 Wu et al.
2018/0211620 A1   7/2018 Kurokawa et al.
(Continued)

FOREIGN PATENT DOCUMENTS

CN    104572011 A    4/2015
CN    105426344 A    3/2016
(Continued)

OTHER PUBLICATIONS

First Office action issued in related Chinese Application No. 201711455388.4, dated Nov. 22, 2019, 10 pages.
(Continued)

*Primary Examiner* — Simon P Kanaan
(74) *Attorney, Agent, or Firm* — Bayes PLLC

(57) ABSTRACT

An integrated circuit chip device and related products are provided. The integrated circuit chip device is used for performing a multiplication operation, a convolution operation or a training operation of a neural network. The device has the advantages of small calculation amount and low power consumption.

20 Claims, 20 Drawing Sheets

Related U.S. Application Data continuation of application No. PCT/CN2018/123929, filed on Dec. 26, 2018.

(30) Foreign Application Priority Data

Dec. 28, 2017 (CN) .......................... 201711469614.4
Dec. 28, 2017 (CN) .......................... 201711469615.9

(56) References Cited

U.S. PATENT DOCUMENTS

2019/0042870 A1  2/2019  Chen et al.
2020/0090029 A1  3/2020  Suzuki

FOREIGN PATENT DOCUMENTS

| CN | 106126481 A | 11/2016 |
|---|---|---|
| CN | 107229967 A | 10/2017 |
| CN | 107330515 A | 11/2017 |
| CN | 109961136 A | 7/2019 |
| CN | 109961138 A | 7/2019 |

OTHER PUBLICATIONS

First Office action issued in related Chinese Application No. 201711455397.3, dated Nov. 14, 2019, 8 pages.
Second Office action issued in related Chinese Application No. 201711455397.3, dated Mar. 3, 2020, 7 pages.
First Office action issued in related Chinese Application No. 201711469615.9, dated Nov. 20, 2019, 10 pages.
First Office action issued in related Chinese Application No. 201711468629.9, dated Dec. 3, 2019, 8 pages.
Extended European Search Report in related European Application No. 20203232.2, dated Feb. 4, 2021 (7 pages).
Office Action in related Chinese Application No. 201711466943.3, dated Nov. 29, 2019 (10 pages).
Farabet et al., "Hardware Accelerated Convolutional Neural Networks for Synthetic Vision Systems", IEEE International Symposium on Circuits and Systems, May 30, 2010 (4 pages).

INTEGRATED CIRCUIT CHIP DEVICE

CROSS-REFERENCE TO RELATED APPLICATIONS

This application is a continuation of U.S. patent application Ser. No. 16/903,304, filed Jun. 16, 2020, which is a continuation of International Application No. PCT/CN2018/123929, filed Dec. 26, 2018, which claims the benefits of priority to Chinese Application Nos. 201711455388.4, filed Dec. 27, 2017; 201711455397.3, filed Dec. 27, 2017; 201711466943.3, filed Dec. 28, 2017; 201711468629.9, filed Dec. 28, 2017; 201711469408.3, filed Dec. 28, 2017; 201711469614.4, filed Dec. 28, 2017; and 201711469615.9, filed Dec. 28, 2017. The entire contents of each of the above-identified applications are expressly incorporated herein by reference.

TECHNICAL FIELD

The present disclosure relates to the field of neural network, and particularly relates to an integrated circuit chip device.

BACKGROUND

ANN (Artificial Neural Network) is a research focus emerged in 1980s in the field of artificial intelligence. ANN abstracts the human brain neuron network in terms of information processing to establish a simple model, and then builds different networks with different connection methods. ANN is often referred to as neural network in engineering and academia. Neural networks are a type of computational model. They are formed by a large number of interconnecting nodes (or may be referred to as neurons). Existing neural networks rely on CPU (Central Processing Unit) or GPU (Graphics Processing Unit) to realize neural network operations which often require a large amount of computations and cause high power consumption.

SUMMARY

The present disclosure provides an integrated circuit chip device and a product thereof. Compared with the existing integrated circuit chip device, the disclosed integrated circuit chip device and the product thereof can reduce computations and power consumption.

A first aspect provides an integrated circuit chip device configured to perform neural network forward computations. The neural network has n layers. The integrated circuit chip device includes a main processing circuit and a plurality of basic processing circuits. The main processing circuit includes a data type conversion circuit configured to convert data between a floating point data type and a fixed point data type.

The main processing circuit is configured to receive a first operation instruction, parse the first operation instruction to obtain a first computation instruction included in an $i^{th}$ layer of the forward computations of the first operation instruction and corresponding input data and weight data of the first operation instruction. i is an integer greater than or equal to 1 and less than or equal to n. For instance, if i is greater than or equal to 2, the input data is output data of an $(i-1)^{th}$ layer.

The main processing circuit is configured to determine a first complexity of the first computation instruction according to the input data, the weight data, and the first computation instruction, determine a first data type corresponding to the first computation instruction according to the first complexity, and determine whether to start the data type conversion circuit according to the first complexity. The first data type is the floating point type or the fixed point type.

The main processing circuit is configured to classify the input data of the first data type and the weight data of the first data type into a broadcasting data block and a distribution data block according to a type of the first computation instruction, partition the distribution data block to obtain a plurality of basic data blocks, distribute the plurality of basic data blocks to at least one of the plurality of basic processing circuits, and broadcast the broadcasting data block to the plurality of basic processing circuits.

The plurality of basic processing circuits are configured to perform computations on the broadcasting data block and the basic data blocks in the first data type to obtain computation results, and transfer the computation results to the main processing circuit.

The main processing circuit is configured to process the computation results to obtain an instruction result of the first computation instruction so that computations of the first computation instruction of the $i^{th}$ layer are completed.

Alternatively or additionally, the main processing circuit is configured to compare the first complexity with a preset threshold. If the first complexity is greater than the preset threshold, the main processing circuit determines the first data type as a fixed point type. If the first complexity is less than or equal to the preset threshold, the main processing circuit determines the first data type as a floating point type.

Alternatively or additionally, the main processing circuit is configured to determine whether the input data and the weight data belong to a second data type. If the second data type differs from the first data type, the main processing circuit converts the input data belonging to the second data type and the weight data belonging to the second data type into the input data belonging to the first data type and the weight data belonging to the first data type through the data type conversion circuit.

Alternatively or additionally, if the first computation instruction is a convolution computation instruction, the main processing circuit is configured to determine the input data as convolution input data, and determine the weight data as a convolution kernel.

The first complexity is computed as: the first complexity=$\alpha*C1*kH*kW*M*N*W*C2*H$. $\alpha$ is a convolution coefficient greater than 1. C1, kH, kW, M are values of four dimensions of the convolution kernel. N, W, C2, H are values of four dimensions of the convolution input data.

If the first complexity is greater than the preset threshold, the main processing circuit determines whether the convolution input data and the convolution kernel are floating point data. If the convolution input data and the convolution kernel are not floating point data, the main processing circuit converts the convolution input data and the convolution kernel into floating point data, and performs convolution computations on the convolution input data and the convolution kernel of the floating point type.

Alternatively or additionally, if the first computation instruction is a matrix-multiply-matrix computation instruction, the main processing circuit is configured to determine the input data as a first matrix in the matrix-multiply-matrix computation, and determine the weight data as a second matrix in the matrix-multiply-matrix computation.

The first complexity is computed as: the first complexity=$\beta*F*G*E*F1$. $\beta$ is a matrix coefficient greater than or equal to 1. F and G are row and column values of the first matrix. E and F1 are row and column values of the second matrix.

If the first complexity is greater than the preset threshold, the main processing circuit determines whether the first matrix and the second matrix are floating point data. If the first matrix and the second matrix are not floating point data, the main processing circuit converts the first matrix and the second matrix into floating point data, and performs matrix-multiply-matrix computations on the first matrix and the second matrix of the floating point type.

Alternatively or additionally, if the first computation instruction is a matrix-multiply-vector computation instruction, the main processing circuit is configured to determine the input data as a first matrix in the matrix-multiply-vector computation, and determine the weight as a vector in the matrix-multiply-vector computation.

The first complexity is computed as: the first complexity=$\beta*F*G*F1$. $\beta$ is a matrix coefficient greater than or equal to 1. F and G are row and column values of the first matrix. F1 is a column value of the vector.

If the first complexity is greater than the preset threshold, the main processing circuit determines whether the first matrix and the vector are floating point data. If the first matrix and the vector are not floating point data, the main processing circuit converts the first matrix and the vector into floating point data, and performs matrix-multiply-vector computations on the first matrix and the vector of the floating point data type.

Alternatively or additionally, if the type of the first computation instruction is a multiplication instruction, the main processing circuit is configured to classify the input data into a distribution data block, and classify the weight data into a broadcasting data block. If the type of the first computation instruction is a convolution instruction, the main processing circuit classifies the input data into a broadcasting data block, and classifies the weight data into a distribution data block.

A second aspect provides a neural network computing device. The neural network computing device includes one or more of the integrated circuit chip devices provided in the first aspect.

A third aspect provides a combined processing device. The combined processing device includes: the neural network computing device provided in the second aspect, a general interconnection interface, and a general processing device.

The neural network computing device is connected to the general processing device through the general interconnection interface.

A fourth aspect provides a chip that integrates the device of the first aspect, the device of the second aspect, or the device of the third aspect.

A fifth aspect provides an electronic device which includes the chip of the fourth aspect.

A sixth aspect provides a neural network operation method. The method is applied to an integrated circuit chip device. The integrated circuit chip device includes: the integrated circuit chip device provided in the first aspect which is configured to perform a neural network operation.

It can be seen that, according to examples of the present disclosure, a data type conversion circuit is provided to convert a type of a data block before an operation is performed, which may save resources for transmission and computation, and may thus have technical effects of low power consumption and a small amount of computation.

BRIEF DESCRIPTION OF THE DRAWINGS

In order to illustrate the technical solutions in the examples of the present disclosure more clearly, the drawings to be used in the description of the examples are briefly explained below. Obviously, the drawings in the description below are some examples of the present disclosure. Other drawings can be obtained according to the disclosed drawings without any creative effort by those skilled in the art.

DETAILED DESCRIPTION

Technical solutions in examples of the present disclosure will be described clearly and completely hereinafter with reference to the accompanied drawings in the examples of the present disclosure. Obviously, the examples to be described are merely some rather than all examples of the present disclosure. All other examples obtained by those of ordinary skill in the art based on the examples of the present disclosure without creative efforts shall fall within the protection scope of the present disclosure.

Terms such as "first", "second", "third", and "fourth" in the specification, the claims, and the drawings are used for distinguishing different objects rather than describing a specific order. In addition, terms such as "include", "have", and any variant thereof are used for indicating non-exclusive inclusion. For instance, a process, a method, a system, a product, or an equipment including a series of steps or units is not limited to the listed steps or units, but may include steps or units that are not listed, or may include other steps or units inherent to the process, the method, the product, or the equipment.

Reference to "example" means that a particular feature, a structure, or a characteristic described in conjunction with the example may be included in at least one example of the present disclosure. The use of the term in various places in the specification does not necessarily refer to the same example, nor is it referring independent or alternative examples that are mutually exclusive with other examples. It is explicitly and implicitly understood by those skilled in the art that the examples described in the specification may be combined with other examples.

Figure 4:
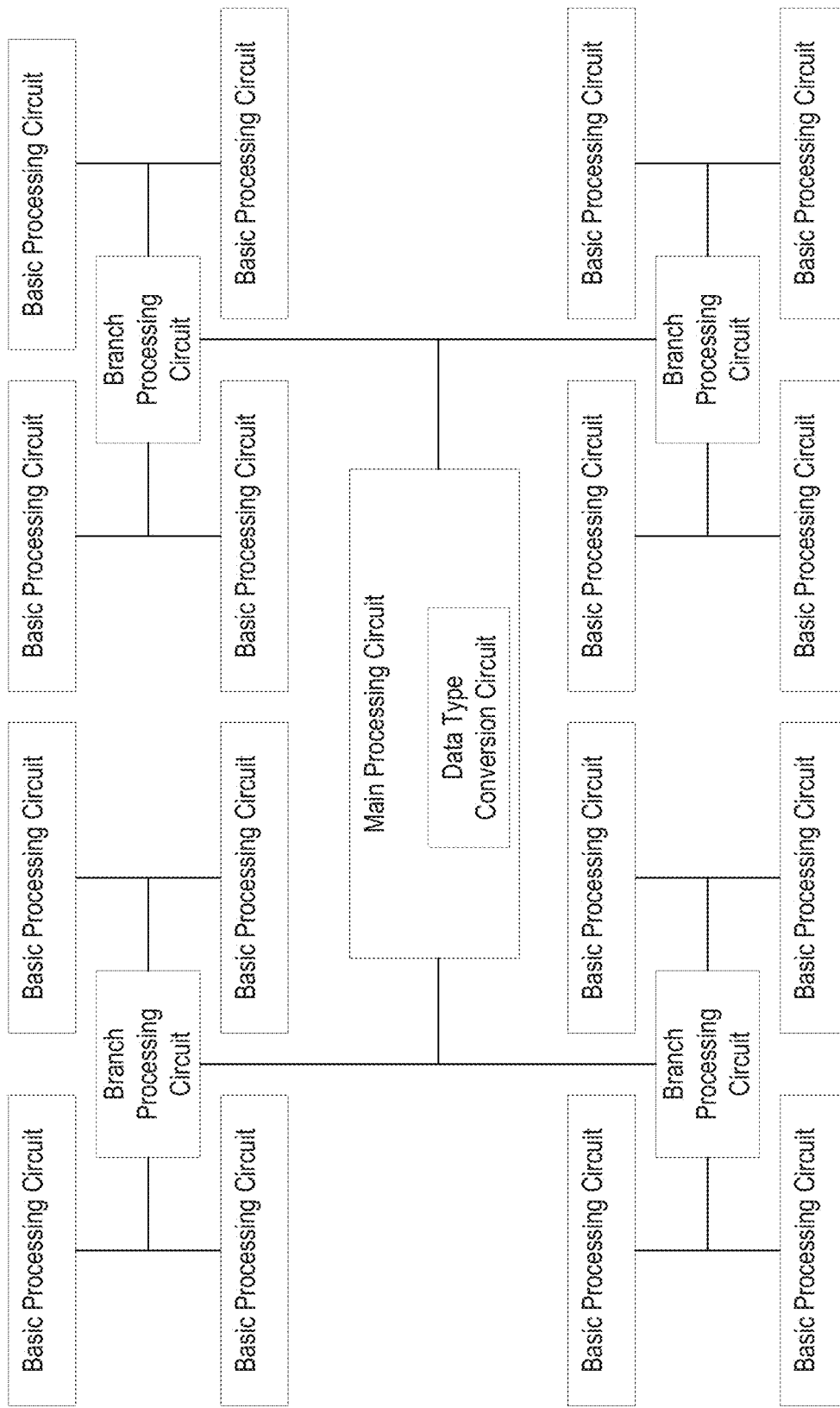
FIG. 4 is a structural diagram of an integrated circuit chip device.

As shown in FIG. 4, the present disclosure provides an integrated circuit chip device configured to perform neural network forward computations. The neural network has n layers. The integrated circuit chip device includes a main processing circuit and a plurality of basic processing circuits. The main processing circuit includes a data type conversion circuit configured to convert data between a floating point data type and a fixed point data type.

The main processing circuit is configured to receive a first operation instruction, parse the first operation instruction to obtain a first computation instruction included in an $i^{th}$ layer of the forward computations of the first operation instruction and corresponding input data and weight data of the first operation instruction. i is an integer greater than or equal to 1 and less than or equal to n. For instance, if i is greater than or equal to 2, the input data is output data of an $(i-1)^{th}$ layer.

The main processing circuit is configured to determine a first complexity of the first computation instruction according to the input data, the weight data, and the first computation instruction, determine a first data type corresponding to the first computation instruction according to the first complexity, and determine whether to turn on the data type conversion circuit according to the first complexity. The first data type is the floating point type or the fixed point type.

The main processing circuit is configured to classify the input data of the first data type and the weight data of the first data type into a broadcasting data block and a distribution data block according to a type of the first computation instruction, partition the distribution data block to obtain a plurality of basic data blocks, distribute the plurality of basic data blocks to at least one of the plurality of basic processing circuits, and broadcast the broadcasting data block to the plurality of basic processing circuits.

The plurality of basic processing circuits are configured to perform computations on the broadcasting data block and the basic data blocks according to the fixed point data type to obtain computation results, and transfer the computation results to the main processing circuit.

The main processing circuit is configured to process the computation results to obtain an instruction result of the first computation instruction so that computations of the first computation instruction of the $i^{th}$ layer are completed.

Alternatively or additionally, the device may further include branch circuits. Each of the branch circuits is connected between the main processing circuit and the plurality of basic processing circuits, and is configured to convert data for the main processing circuit and the plurality of basic processing circuits. With the branch processing circuits, more basic processing circuits can be connected to the main processing circuit, and the data transfer overhead of the main processing circuit may be reduced.

Figure 6:
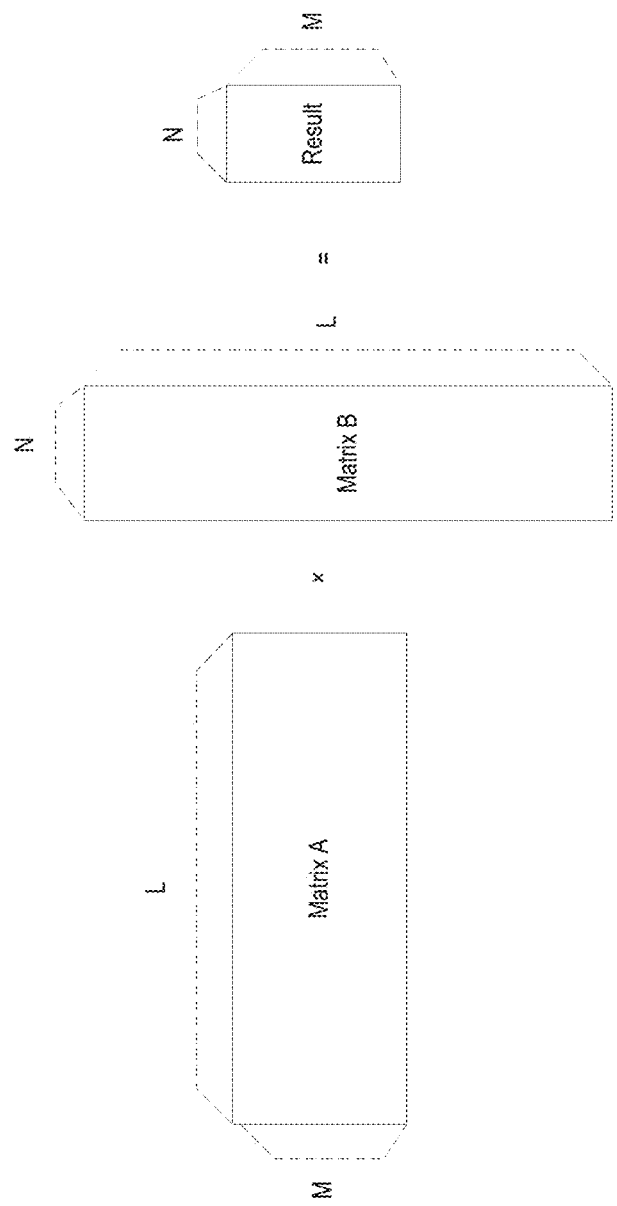
FIG. 6 is a schematic diagram showing a matrix-multiply-vector computation.

FIG. 6 shows a neural network forward computation provided by an example of the present disclosure. Each layer uses input data and a weight of the layer to obtain corresponding output data by performing computations according to a computation rule designated by a type of the layer.

The forward computation (also referred to as inference) of a neural network is a process of obtaining output data by processing input data of each layer and performing computations layer by layer, which has the following characteristics:

input of a layer:
input of a layer may be input data of a neural network;
input of a layer may be output data of another layer;
input of a layer may be output of the present layer at a last time (corresponding to a case of a recurrent neural network); and
a layer may obtain input from a plurality of above-mentioned input sources simultaneously. output of a layer:
output of a layer may serve as an output result of a neural network;
output of a layer may be input of another layer; and output of a layer may be input of the present layer at a next time (corresponding to a case of a recurrent neural network).

A layer may output a result to a plurality of the output directions above.

Specifically, a type of a computation of a layer in the neural network may include but is not limited to:
a convolution layer (for performing a convolution computation);
a fully connected layer (for performing a fully connected computation);
a normalization layer, including a LRN (Local Response Normalization) layer, a BN (Batch Normalization) layer, and other types of layer;
a pooling layer; and
an activation layer, including but not limited to a Sigmoid layer, a ReLU layer, a PReLu layer, a LeakyReLu layer, and a Tanh layer.

A backward computation of a neural network layer includes computations of two parts. A first part is computing a gradient (a weight used in a weight updating step to update a weight of a current layer) of a weight by using an output data gradient that may be sparse and input data that may be sparse. A second part is computing an input data gradient (used as output data of a next layer in the backward computation so that the backward computation can be performed) by using an output data gradient that may be sparse and a weight that may be sparse.

The backward computation may follow an order that is opposite to an order of a forward computation to transfer a gradient reversely from a last layer.

In an alternative example, an output data gradient obtained from the backward computation of a layer may be from:
a gradient returned by a last lost function (or cost function) of the neural network;
an input data gradient of another layer; and
an input data gradient of the present layer at a last time (corresponding to a case of a recurrent neural network).

A layer may obtain an output data gradient from a plurality of above-mentioned sources simultaneously.

After the backward computation of the neural network is completed, a gradient of a weight of each layer is obtained. In this step, a first input cache and a second input cache may be configured to store a weight and a gradient of the weight of a layer, then use the gradient of the weight in a computing unit to update the weight.

The above-mentioned computation is a computation of a neural network layer. For a multi-layer neural network, an implementation of the computation may be that, in a forward computation, after the computation of a previous layer of the artificial neural network is completed, a computation instruction of a next layer is performed by using output data obtained by a computing unit as input data of the next layer to perform a computation (or perform some operations on the output data then use the output data as input data of the next layer). At the same time, a weight is replaced with a weight of the next layer. In a backward computation, after the backward computation of a previous layer of the artificial neural network is completed, a computation instruction of a next layer is performed by using an input data gradient obtained by a computing unit as an output data gradient of the next layer to perform a computation (or perform some operations on the input data gradient then use the input data gradient as output data gradient of the next layer). At the same time, a weight is replaced with a weight of the next layer (as shown in the accompanied drawing, the dashed line arrow indicates the backward computation, the continuous line arrow indicates the forward computation. The marks below each figure indicate the meaning of the figure).

The present disclosure provides a method of fixed point data conversion.

The method of fixed point data conversion refers to converting a data representation of a data block in a network into a data representation of which the decimal point has a fixed position (a manner of placing 0/1 bit of data that is mapped to circuit device).

As an alternative example, a plurality of groups of data constitute a plurality of data blocks. The plurality of data blocks may be converted into a fixed point representation as whole according to the same fixed point representation method.

Figure 3:
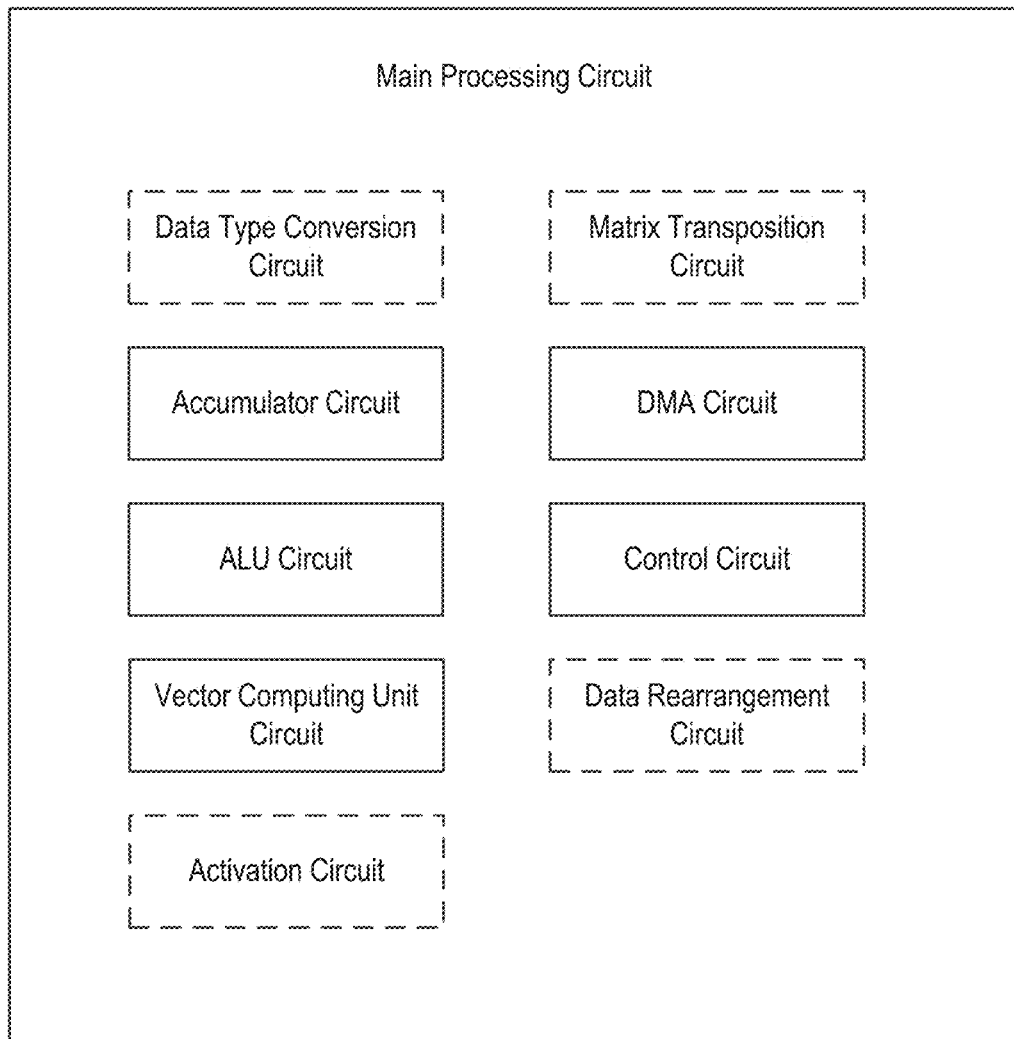
FIG. 3 is a structural diagram of a main processing circuit.

FIG. 3 shows a method of representing a fixed point data structure having fewer digits according to an example of the present disclosure. 1 bit is for representing a symbol, M bits for representing an integer part, and N bits for representing a decimal part. Compared with a 32-bit floating point number representation, the present disclosure uses a fixed point data representation with fewer digits. The data representation above has fewer bits. Additionally, for data of the same layer and the same type in a neural network, such as all weight data of a first convolution layer, a flag bit (point location) is set in the data representation to mark the position of the decimal point. In this way, the precision of the data representation and the representable data range may be adjusted according to the distribution of data.

A floating point number may be represented in 32 bits. The present disclosure uses the fixed point data representation. In this way, bits of a numerical value may be reduced, and data transfer as well as computations may be reduced.

Figure 8:
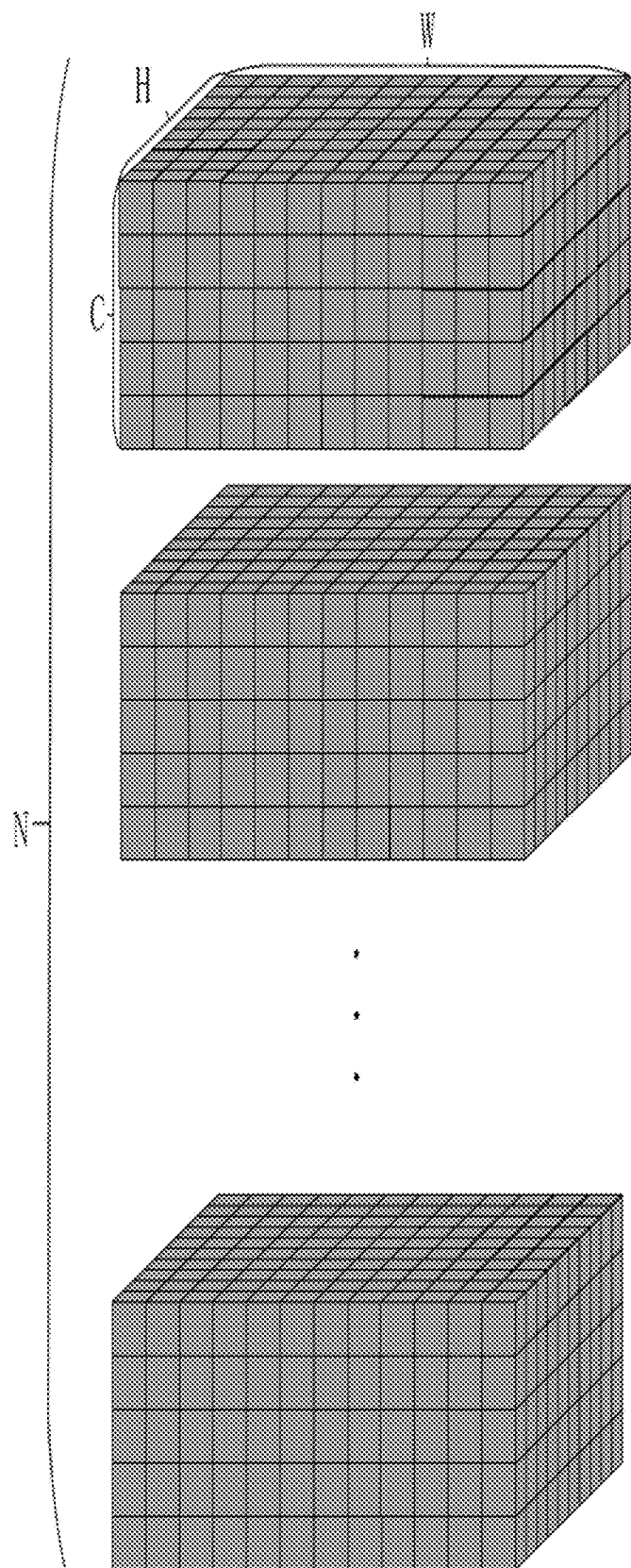
FIG. 8 is a schematic diagram of convolution input data.
Figure 9:
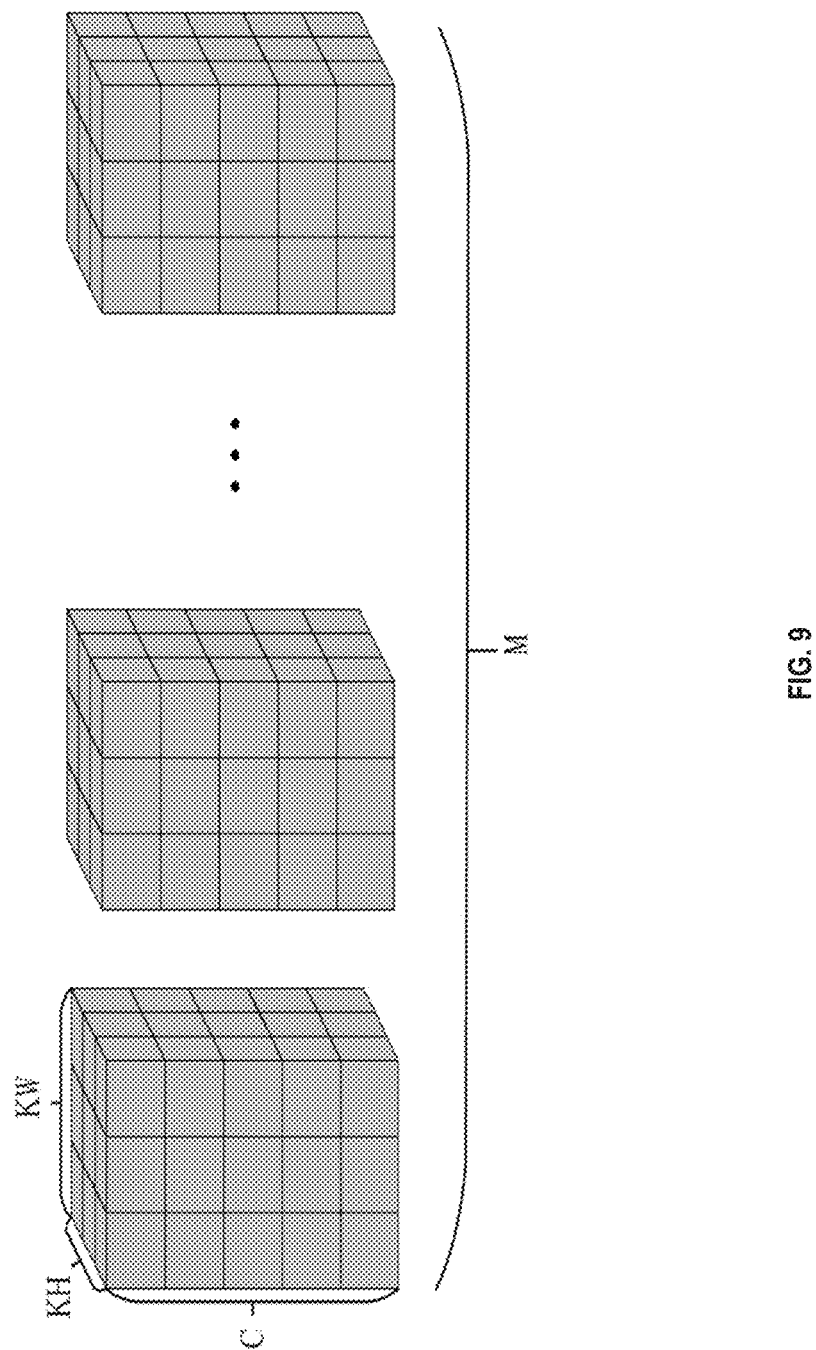
FIG. 9 is a schematic diagram of a convolution kernel.
Figure 10:
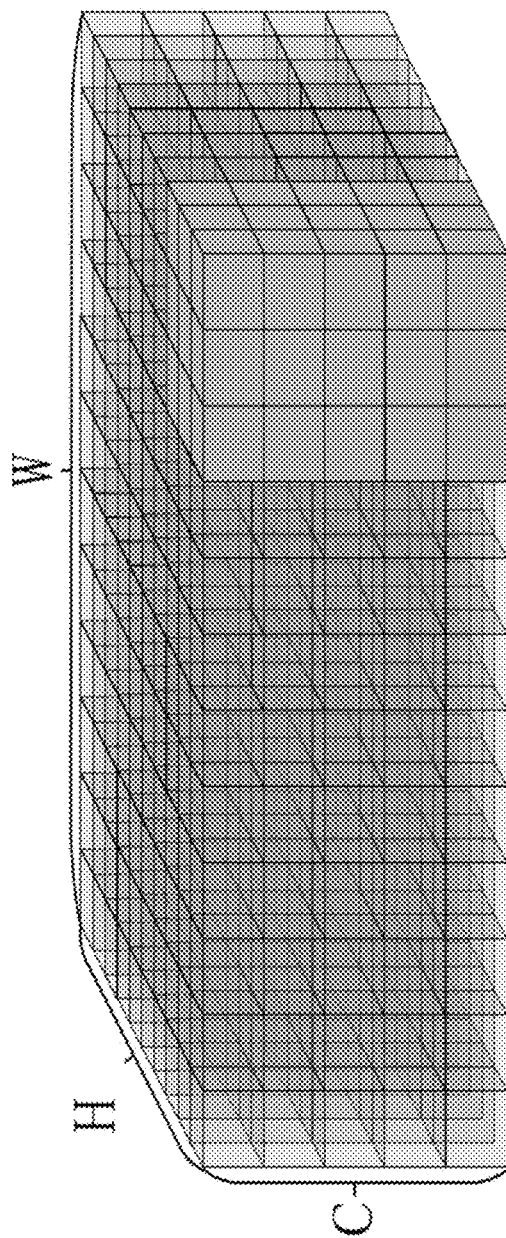
FIG. 10 is a schematic diagram of a computation window of a three-dimensional data block of input data.
Figure 11:
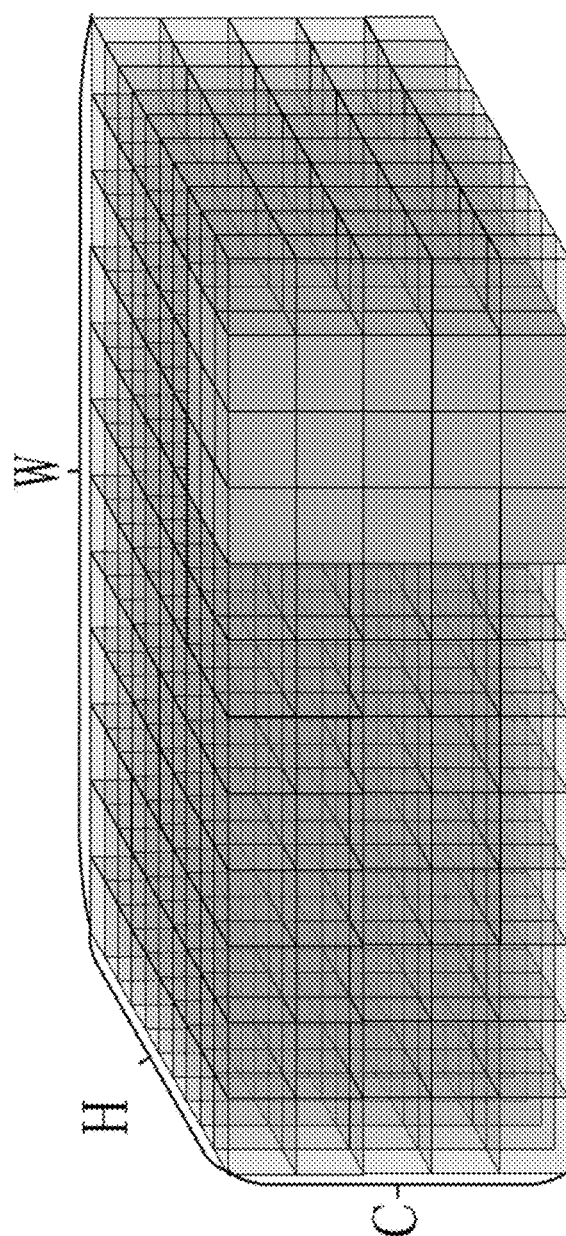
FIG. 11 is a schematic diagram of another computation window of a three-dimensional data block of input data.
Figure 12:
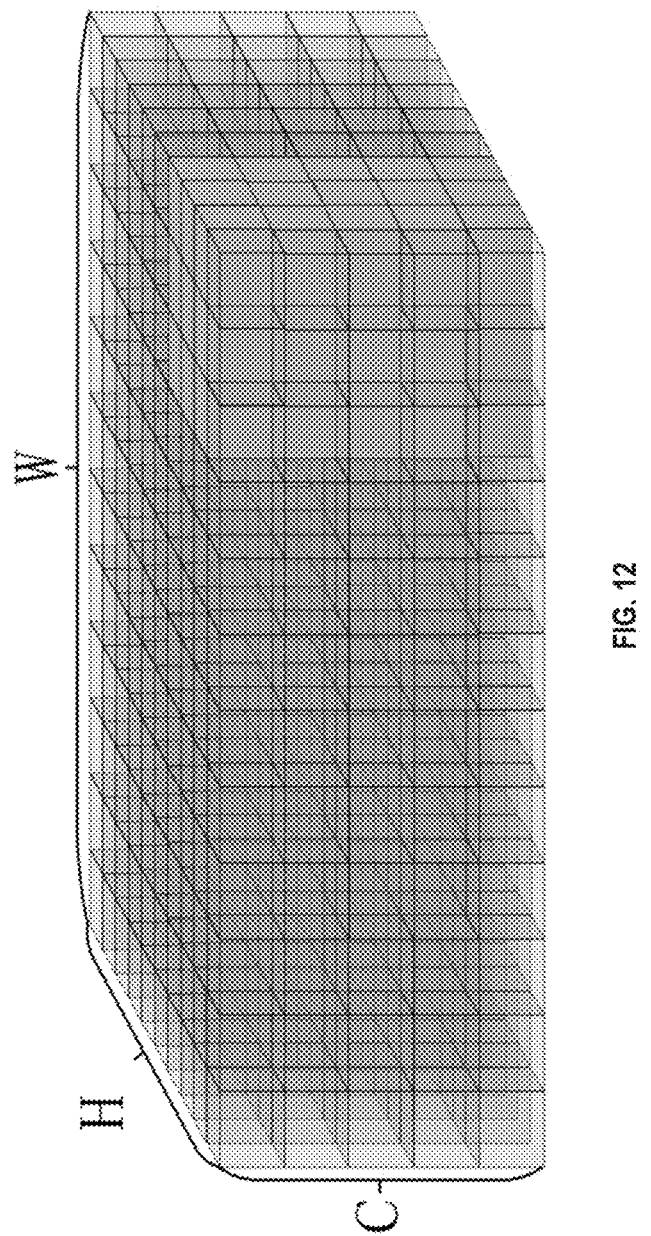
FIG. 12 is a schematic diagram of another computation window of a three-dimensional data block of input data.

Input data is shown in FIG. 8 (N samples, each sample has C channels, and a feature map of each channel has a height of H and a width of W). A weight, which is a convolution kernel, is shown in FIG. 9 (with M convolution kernels. Each convolution kernel has C channels with a height being KH and a width being KW). For the N samples of the input data, rules for convolution computations are the same. Below is an explanation of a process of performing a convolution computation on a sample. Each of the M convolution kernels is subject to the same computation. A plane feature map can be obtained from the computation of each convolution kernel. M plane feature maps can be obtained from the computations of M plane feature maps (for a sample, output of convolution is M feature maps). For a convolution kernel, inner product computations are to be performed on each plane of a sample. Then the convolution kernel slides in a direction of H and a direction of W. For instance, FIG. 10 shows an inner product computation of a convolution kernel at a position at lower right corner of a sample of input data. FIG. 11 shows the convolution kernel slides leftwards for one grid. FIG. 12 shows the convolution kernel slides upwards for one grid.

If a first computation is a convolution computation, the input data is convolution input data, and the weight data is a convolution kernel.

The first complexity is computed as: the first complexity=$\alpha*C1*kH*kW*M*N*W*C2*H$.

$\alpha$ is a convolution coefficient greater than 1. C1, kH, kW, M are values of four dimensions of the convolution kernel. N, W, C2, H are values of four dimensions of the convolution input data.

If the first complexity is greater than the preset threshold, the main processing circuit determines whether the convolution input data and the convolution kernel are floating point data. If the convolution input data and the convolution kernel are not floating point data, the main processing circuit converts the convolution input data and the convolution kernel into floating point data, and performs convolution computations on the convolution input data and the convolution kernel of the floating point type.

Figure 1:
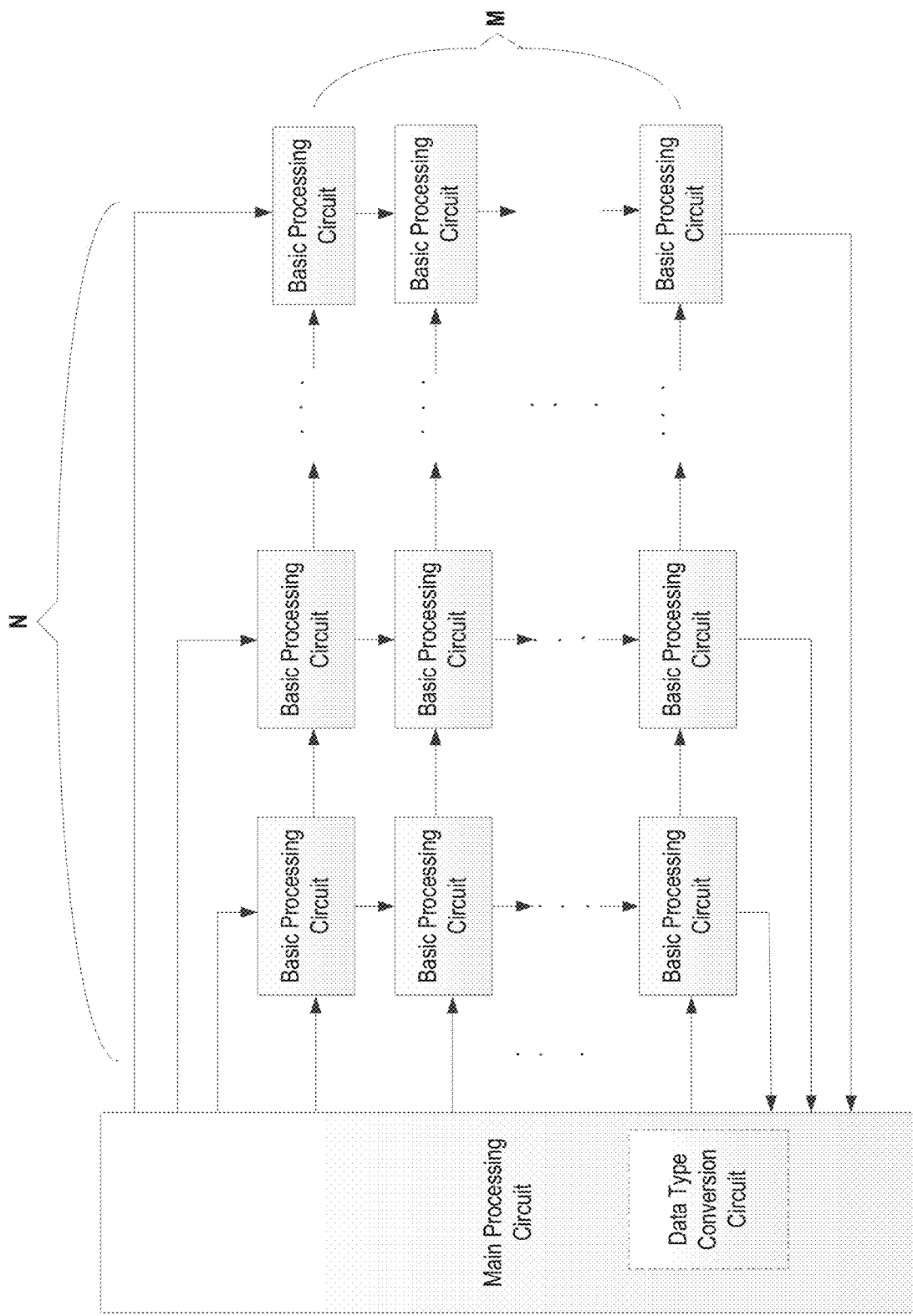
FIG. 1 is a structural diagram of an integrated circuit chip device.

Specifically, a method of convolution process may be performed using the chip structure shown in FIG. 4 or FIG. 1. When the first complexity is greater than the preset threshold, the data type conversion circuit of the main processing circuit (or may be referred to as main unit) converts data in some or all convolution kernels of the weight to fixed point data. The control circuit of the main processing circuit transfers data of some or all convolution kernels of the weight to basic processing circuits (or may be referred to as basic unit) that are directly connected to the main processing circuit via horizontal data input interfaces.

In an alternative example, each time, the control circuit of the main processing circuit transfers a number or some numbers of data in a convolution kernel of the weight to a basic processing circuit. For instance, for a basic processing circuit, a $1^{st}$ number in a $3^{rd}$ row is transferred at a $1^{st}$ time, a $2^{nd}$ number in the $3^{rd}$ row is transferred at a $2^{nd}$ time, a $3^{rd}$ number in the $3^{rd}$ row is transferred at a $3^{rd}$ time, . . . , or first two numbers in a $3^{rd}$ row are transferred at a $1^{st}$ time, a $3^{rd}$ number and a $4^{th}$ number in the $3^{rd}$ row are transferred at a $2^{nd}$ time, a $5^{th}$ number and a $6^{th}$ number in the $3^{rd}$ row are transferred at a $3^{rd}$ time, . . . .

Another case in an alternative example may be that, each time, the control circuit of the main processing circuit transfers a number or some numbers of data of some convolution kernels of the weight to a basic processing circuit. For instance, for a basic processing circuit, $1^{st}$ numbers in a $3^{rd}$, $4^{th}$, and $5^{th}$ rows are transferred at a $1^{st}$ time, $2^{nd}$ numbers in the $3^{rd}$, $4^{th}$, and $5^{th}$ rows are transferred at a $2^{nd}$ time, $3^{rd}$ numbers in the $3^{rd}$, $4^{th}$, and $5^{th}$ rows are transferred at a $3^{rd}$ time, . . . , or first two numbers in the $3^{rd}$, $4^{th}$, and $5^{th}$ rows are transferred at a $1^{st}$ time, $3^{rd}$ numbers and $4^{th}$ numbers in the $3^{rd}$, $4^{th}$, and $5^{th}$ rows are transferred at a $2^{nd}$ time, $5^{th}$ numbers and $6^{th}$ numbers in the $3^{rd}$, $4^{th}$, and $5^{th}$ rows are transferred at a $3^{rd}$ time, . . . .

The control circuit of the main processing circuit classifies input data according to positions of convolution, and transfers data of some or all positions of convolution in the input data to the basic processing circuits that are directly connected to the main processing circuit via vertical data input interfaces.

In an alternative example, each time, the control circuit of the main processing circuit transfers a number or some numbers of data of a position of convolution in the input data to a basic processing circuit. For instance, for a basic processing circuit, a $1^{st}$ number in a $3^{rd}$ column is transferred at a $1^{st}$ time, a $2^{nd}$ number in the $3^{rd}$ column is transferred at a $2^{nd}$ time, a $3^{rd}$ number in the $3^{rd}$ column is transferred at a $3^{rd}$ time, . . . , or first two numbers in the $3^{rd}$ column are transferred at a $1^{st}$ time, a $3^{rd}$ number and a $4^{th}$ number in the $3^{rd}$ column are transferred at a $2^{nd}$ time, a $5^{th}$ number and a $6^{th}$ number in the $3^{rd}$ column are transferred at a $3^{rd}$ time, . . . .

Another case in an alternative example may be that, each time, the control circuit of the main processing circuit transfers a number or some numbers of data of some positions of convolution in the input data to a basic processing circuit. For instance, for a basic processing circuit, $1^{st}$ numbers in a $3^{rd}$, $4^{th}$, and $5^{th}$ columns are transferred at a $1^{st}$ time, $2^{nd}$ numbers in the $3^{rd}$, $4^{th}$, and $5^{th}$ columns are transferred at a $2^{nd}$ time, $3^{rd}$ numbers in the $3^{rd}$, $4^{th}$, and $5^{th}$ columns are transferred at a $3^{rd}$ time, . . . , or first two numbers in the $3^{rd}$, $4^{th}$, and $5^{th}$ columns are transferred at a $1^{st}$ time, $3^{rd}$ numbers and $4^{th}$ numbers in the $3^{rd}$, $4^{th}$, and $5^{th}$ columns are transferred at a $2^{nd}$ time, $5^{th}$ numbers and $6^{th}$ numbers in the $3^{rd}$, $4^{th}$, and $5^{th}$ columns are transferred at a $3^{rd}$ time, . . . .

After receiving the data of the weight, the basic processing circuit transfers the data to a subsequent basic processing circuit that is connected to the basic processing circuit via a horizontal data output interface of the basic processing circuit. After receiving the input data, the basic processing circuit transfers the data to a subsequent basic processing circuit that is connected to the basic processing circuit via a vertical data output interface of the basic processing circuit.

Each basic processing circuit performs computations on received data.

In an alternative example, each time, the basic processing circuit performs multiplication of one group or a plurality of groups of two sets of data, then accumulates results in the register and/or on-chip cache.

In an alternative example, each time, the basic processing circuit computes an inner product of one group or a plurality of groups of two vectors, then accumulates results in the register and/or on-chip cache.

After the basic processing circuit obtains a result by computing, the basic processing circuit outputs the result through the data output interface.

In an alternative example, the computation result may be a final result or an intermediate result of an inner product computation.

Specifically, if the basic processing circuit has an output interface that is directly connected to the main processing circuit, the basic processing circuit outputs the result via the interface. If the basic processing circuit does not have such output interface, the basic processing circuit outputs the result towards a basic processing circuit that can output to the main processing circuit directly.

After the basic processing circuit receives a computation result from another basic processing circuit, the basic processing circuit transfers the data to yet another basic processing circuit that is connected to the basic processing circuit or to the main processing circuit.

The basic processing circuit outputs a result towards the main processing circuit (for instance, basic processing circuits at a bottom row can transfer results to the main processing circuit directly, and other basic processing circuits may transfer results downwards via vertical output interfaces).

The main processing circuit receives inner product computation results transferred by the respective basic processing circuit to obtain an output result.

FIG. 6 shows a matrix-multiply-matrix computation. If the first computation is a matrix-multiply-matrix computation, the input data is a first matrix in the matrix-multiply-matrix computation, and the weight data is a second matrix in the matrix-multiply-matrix computation.

The first complexity is computed as: the first complexity=$\beta$*F*G*E*F1. $\beta$ is a matrix coefficient greater than or equal to 1. F and G are row and column values of the first matrix. E and F1 are row and column values of the second matrix.

If the first complexity is greater than the preset threshold, it needs to be determined whether the first matrix and the second matrix are floating point data. If the first matrix and the second matrix are not floating point data, the first matrix and the second matrix are converted into floating point data. Then the first matrix and the second matrix are subject to a matrix-multiply-matrix computations of the floating point type.

Figure 19:
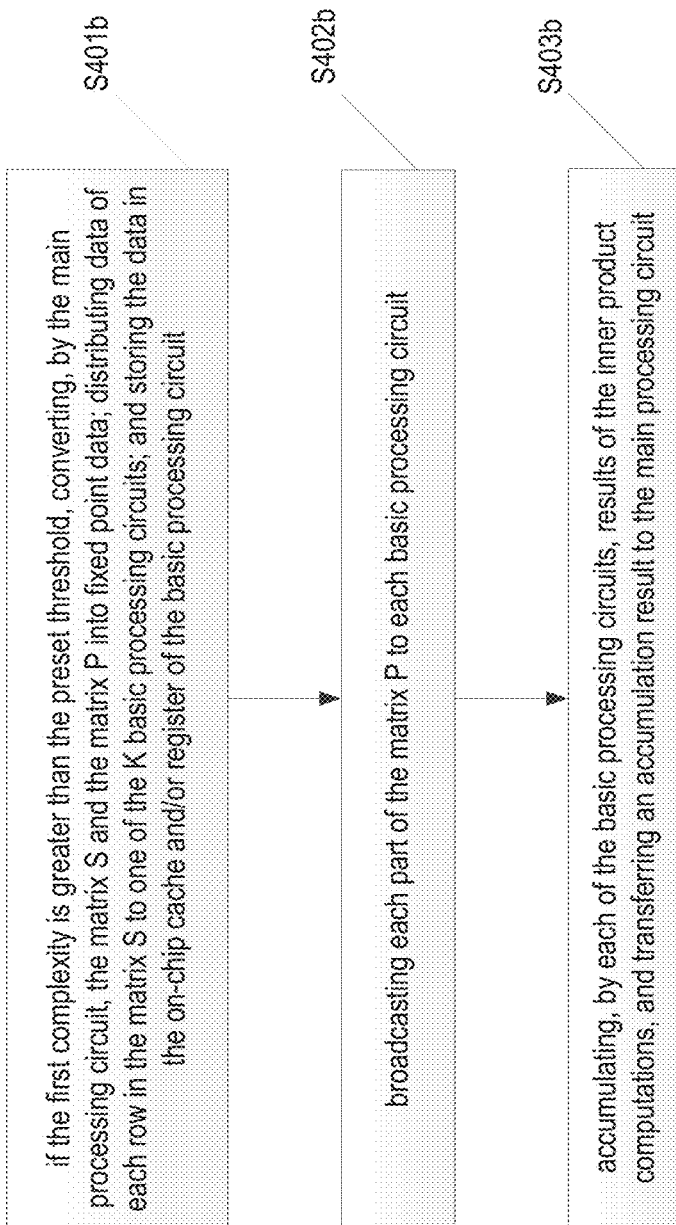
FIG. 19 is a flowchart of a method of a matrix-multiply-matrix computation.

FIG. 19 is a flowchart of using the device of FIG. 4 to perform a matrix-multiply-matrix computation.

Below is a description of performing multiplication of a matrix S with a size of M rows and L columns and a matrix P with a size of L rows and N columns (each row of the matrix S is as long as each column of the matrix P, which is as shown in FIG. 11). The neural network computing device has K basic processing circuits.

A method of the multiplication includes: S401b, if the first complexity is greater than the preset threshold, converting, by the main processing circuit, the matrix S and the matrix P into fixed point data; distributing, by the control circuit of the main processing circuit, data of each row in the matrix S to one of the K basic processing circuits; and storing, by the basic processing circuit, the received data in the on-chip cache and/or the register. Specifically, the data may be transferred to basic processing circuits that are directly connected to the main processing circuit.

As an alternative example, M is the count of rows of the matrix S, if M<=K, the control circuit of the main processing circuit distributes a row of the matrix S to M basic processing circuits respectively.

As an alternative example, M is the count of rows of the matrix S, if M>K, the control circuit of the main processing circuit distributes data of one or a plurality of rows of the matrix S to each basic processing circuit respectively.

In a case where Mi rows of the matrix S are distributed to an $i^{th}$ basic processing circuit, a set of the Mi rows can be referred to as Ai. FIG. 12 shows a computation to be performed by the $i^{th}$ basic processing circuit.

As an alternative example, in each of the basic processing circuits, for instance, in the $i^{th}$ basic processing circuit: the matrix Ai distributed by the main processing circuit is received and stored in the register and/or on-chip cache of the $i^{th}$ basic processing circuit. Technical effects of the example include that data that is transferred later may be reduced, the computational efficiency may be improved, and the power consumption may be reduced.

The method of the multiplication includes: S402b, broadcasting, by the control circuit of the main processing circuit, each part of the matrix P to each basic processing circuit.

As an alternative example, each part of the matrix P may be broadcast for only once to the register or on-chip cache of each basic processing circuit. The $i^{th}$ basic processing circuit may fully reuse data of the matrix P which is obtained at this time to complete an inner product computation corresponding to each row of the matrix Ai. The "reusing" mentioned in the example may be "repeatedly using data by the basic processing circuits during computation". For instance, reusing data of the matrix P may be using the data of the matrix P for a plurality of times.

As an alternative example, the control circuit of the main processing circuit sequentially broadcasts each part of the matrix P to the register or on-chip cache of each basic processing circuit. The $i^{th}$ basic processing circuit does not reuse the data of the matrix P which is obtained at each time, and completes an inner product computation corresponding to each row of the matrix Ai at different times.

As an alternative example, the control circuit of the main processing circuit sequentially broadcasts each part of the matrix P to the register or on-chip cache of each basic processing circuit. The $i^{th}$ basic processing circuit partially reuses the data of the matrix P which is obtained at each time, and completes an inner product computation corresponding to each row of the matrix Ai.

In an alternative example, each of the basic processing circuits, such as the $i^{th}$ basic processing circuit, computes an inner product of the data of the matrix Ai and the data of the matrix P.

The method of the multiplication includes: S403b, accumulating, by the accumulator circuit of each of the basic processing circuits, results of inner product computations, and transferring an accumulation result to the main processing circuit.

As an alternative example, the basic processing circuits may transfer a partial sum obtained from each inner product computation to the main processing circuit for accumulating.

In an alternative example, partial sums obtained from the inner product computations performed each time by the basic processing circuits may be stored in the on-chip caching circuits and/or the registers of the basic processing circuits, and transferred to the main processing circuit after the accumulation ends.

As an alternative example, partial sums obtained from the inner product computations performed each time by the basic processing circuits may also, in some cases, be stored in the on-chip caching circuits and/or the registers of the basic processing circuits for accumulating, and in some cases, be transferred to the main processing circuit for accumulating, then be transferred to the main processing circuit after the accumulation ends.

Figure 5:
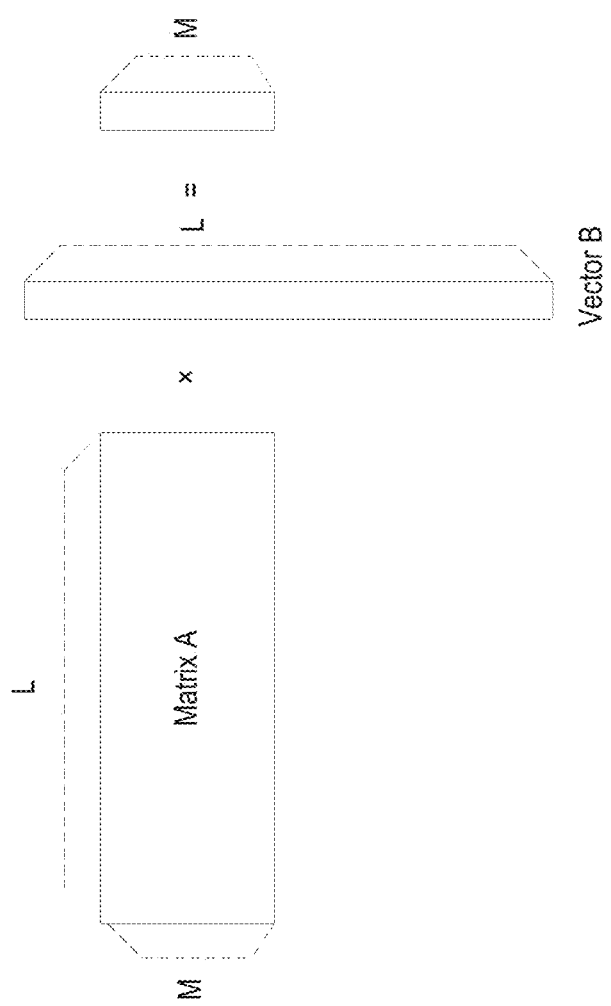
FIG. 5 is a schematic diagram showing a matrix-multiply-vector computation.

FIG. 5 is a schematic diagram of a matrix-multiply-vector computation. The first computation may be: a matrix-multiply-vector computation. The input data is a first matrix in the matrix-multiply-vector computation, and the weight data is a vector in the matrix-multiply-vector computation.

The first complexity=β*F*G*F1. β is a matrix coefficient greater than or equal to 1, F and G are row and column values of the first matrix, and F1 is a column value of the vector.

If the first complexity is greater than the preset threshold, the method includes determining whether the first matrix and the vector are floating point data, if the first matrix and the vector are not floating point data, converting the first matrix and the vector into floating point data, and then performing a matrix-multiply-vector computation on the first matrix and the vector of the floating point data type.

Figure 20:
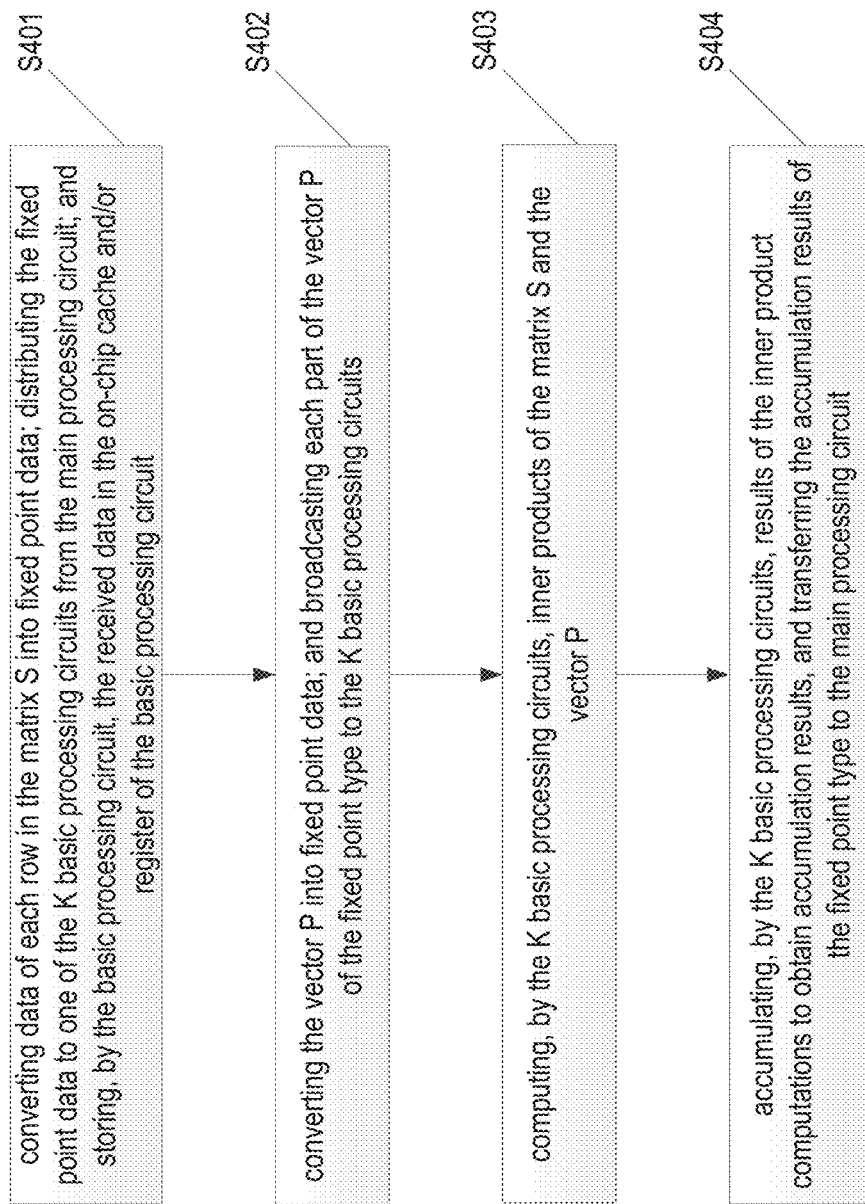
FIG. 20 is a flowchart of a method of a matrix-multiply-vector computation.

Referring to FIG. 20, an implementation method of a matrix-multiply-vector computation is provided, which includes:

S401, converting, by the data type conversion circuit of the main processing circuit, data of each row in the matrix S into fixed point data; distributing, by the control circuit of the main processing circuit, the fixed point data to one of the K basic processing circuits; and storing, by the basic processing circuits, the received data in the on-chip caches and/or the registers of the basic processing circuits.

In an alternative example, M is the count of rows of the matrix S. If M<=K, the control circuit of the main processing circuit distributes a row of the matrix S to the K basic processing circuits respectively.

As an alternative example, M is the count of rows of the matrix S. If M>K, the control circuit of the main processing circuit distributes data of one or a plurality of rows of the matrix S to each of the basic processing circuits respectively.

A set of rows of the matrix S that are distributed to an $i^{th}$ basic processing circuit is referred to as Ai, which has Mi rows in total. FIG. 10 shows a computation to be performed by the $i^{th}$ basic processing circuit.

As an alternative example, for each basic processing circuit, such as the $i^{th}$ basic processing circuit, the received data such as a matrix Ai which is transferred by distributing may be stored in the register and/or on-chip cache. Technical effects of the example include that data that is transferred later by distributing may be reduced, the computational efficiency may be improved, and the power consumption may be reduced.

The method includes: S402, converting, by the data type conversion circuit of the main processing circuit, the vector P into fixed point data, and broadcasting, by the control circuit of the main processing circuit, each part of the fixed point vector P to the K basic processing circuits.

As an alternative example, the control circuit of the main processing circuit may broadcast each part of the vector P for only once to the register or on-chip cache of each basic processing circuit. The $i^{th}$ basic processing circuit fully reuses data of the vector P which is obtained at this time to complete an inner product computation corresponding to each row of the matrix Ai. Technical effects of the example include that the data of the vector P which are repeatedly transferred from the main processing circuit to the basic processing circuits may be reduced, the execution efficiency may be improved, and the power consumption for transfer may be reduced.

As an alternative example, the control circuit of the main processing circuit sequentially broadcasts each part of the vector P to the register or on-chip cache of each basic processing circuit. The $i^{th}$ basic processing circuit does not reuse data of the vector P which is obtained at each time, and completes an inner product computation corresponding to each row of the matrix Ai at different times. Technical effects of the example include that the data of the vector P which is transferred at a single time in the basic processing circuits may be reduced, the capacity of the cache and/or the register of the basic processing circuits may be reduced, the execution efficiency may be improved, the power consumption of transferring may be reduced, and the costs may be reduced.

As an alternative example, the control circuit of the main processing circuit may sequentially broadcast each part of the vector P to the register or on-chip cache of each basic processing circuit. The $i^{th}$ basic processing circuit partly reuses data of the vector P which is obtained at each time to complete an inner product computation corresponding to each row of the matrix Ai. Technical effects of the example include that the data transferred from the main processing circuit to the basic processing circuits may be reduced, the data that is transferred within the basic processing circuits may be reduced, the execution efficiency may be improved, and the power consumption of transferring may be reduced.

The method includes: S403, computing, by the inner product computing unit circuits of the K basic processing circuits, inner products of the matrix S and the vector P, for instance, computing, by the $i^{th}$ basic processing circuit, an inner product of the data of matrix Ai and the data of the vector P; and S404, accumulating, by the accumulator circuits of the K basic processing circuits, results of the inner product computations to obtain accumulation results, and transferring the accumulation results of the fixed point type to the main processing circuit.

As an alternative example, a partial sum obtained from the inner product computation performed each time by a basic processing circuit may be transferred to the main processing circuit for accumulating (the partial sum refers to part of the accumulation result, for instance, if the accumulation result is F1*G1+F2*G2+F3*G3+F4*G4+F5*G5, the partial sum may be the value of F1*G1+F2*G2+F3*G3). Technical effects of the example include that computations performed within the basic processing circuit may be reduced, and the computational efficiency of the basic processing circuit may be improved.

In an alternative example, a partial sum obtained from the inner product computation performed each time by a basic processing circuits may be stored in the on-chip caching circuit and/or the register of the basic processing circuit, and transferred to the main processing circuit after the accumulation ends. Technical effects of the example include that data which are transferred between the basic processing circuits and the main processing circuit may be reduced, the computational efficiency may be improved, and the power consumption of data transfer may be reduced.

As an alternative example, a partial sum obtained from the inner product computation performed each time by a basic processing circuits may also, in some cases, be stored in the on-chip caching circuit and/or the register of the basic processing circuit for accumulating, and in some cases, be transferred to the main processing circuit for accumulating, then be transferred to the main processing circuit after the accumulation ends. Technical effects of the example include that data which are transferred between the basic processing circuit and the main processing circuits may be reduced, the computational efficiency may be improved, the power consumption of data transfer may be reduced, computations performed within the basic processing circuit may be reduced, and the computational efficiency of the basic processing circuit may be improved.

Figure 7:
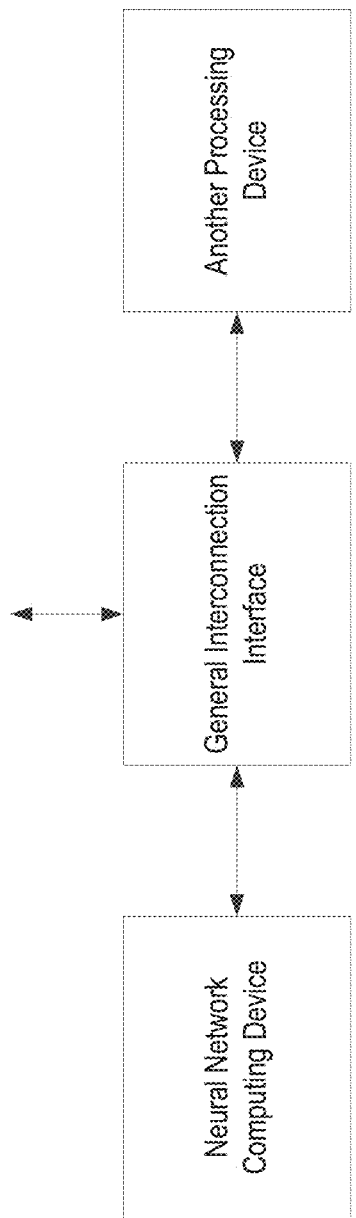
FIG. 7 is a structural diagram of a combined processing device according to the disclosure.

The present disclosure also provides a combined processing device which includes the above-mentioned neural network computing device, a general interconnection interface, and other processing devices (general-purpose processing devices). The neural network computing device interacts with other processing devices to perform operations specified by users. FIG. 7 is a schematic diagram of the combined processing device.

Other processing devices include one or more of a general-purpose/special-purpose processors such as a central processing unit (CPU), a graphics processing unit (GPU), a neural network processor, and the like. The present disclosure does not restrict a count of processors included in the other processing devices. Other processing devices may serve as interfaces that connect the neural network computing device to external data and control for data moving, and may perform the basic control such as starting and stopping the neural network computing device. Other processing devices may also cooperate with the neural network computing device to complete computation tasks.

The general interconnection interface is configured to transfer data and control instructions between the neural network computing device and other processing devices. The neural network computing device may obtain required input data from the other processing devices and write the data in an on-chip storage device of the neural network computing device. The neural network computing device may obtain control instructions from other processing devices, and write the control instructions in an on-chip control cache of the neural network computing device. The neural network computing device may further read data stored in a storage module of the neural network computing device and transfer the data to the other processing device.

Figure 13:
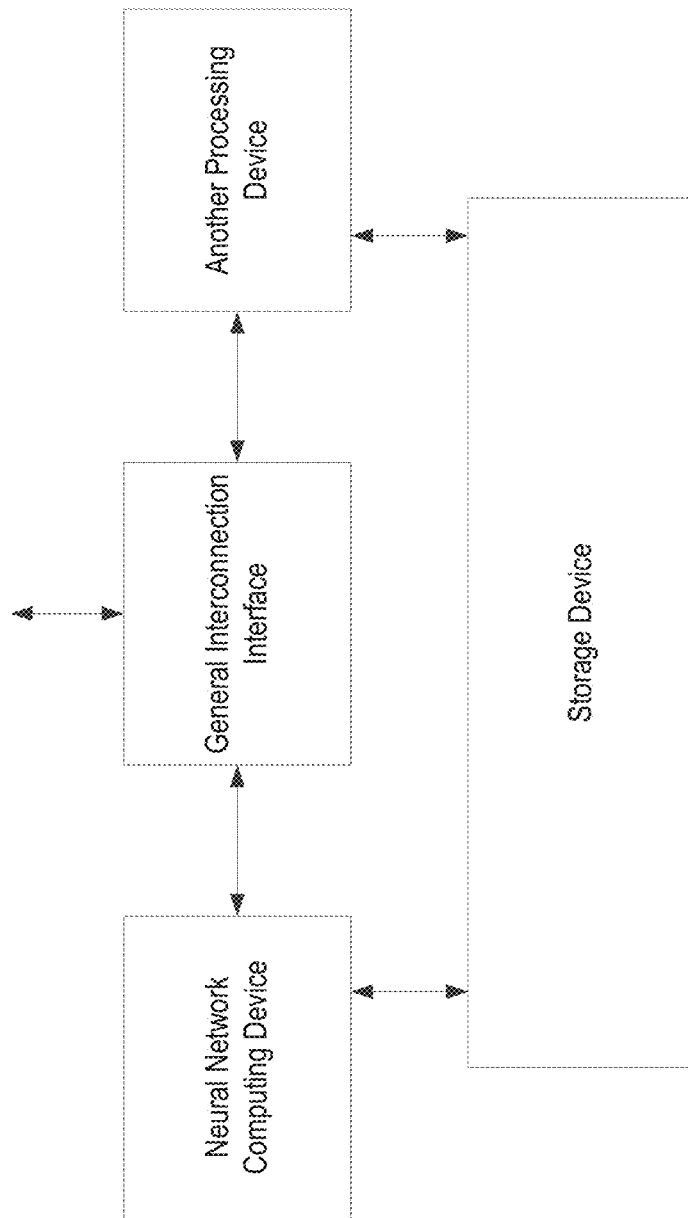
FIG. 13 is another structural diagram of a combined processing device according to the disclosure.

As shown in FIG. 13, Alternatively or additionally, the structure may further include a storage device configured to store required data of a present computing unit/computing apparatus or another computing unit, and is particularly suitable for a case where data that needs to be computed cannot be completely stored in an internal memory of the neural network computing device or another processing devices.

The combined processing device can be used as an SOC (System On Chip) of a device including a mobile phone, a robot, a drone, a video surveillance device, and the like, which may effectively reduce the core area of a control component, increase the processing speed, and reduce the overall power consumption. In this case, a universal interconnection interface of the combined processing device may be connected to some components of the device. The some components include webcams, monitors, mice, keyboards, network cards, and WIFI interfaces.

The present disclosure provides a neural network processor board card which can be used in various general-purpose or special-purpose computing system environments or configurations. For instance, personal computers, server computers, handheld or portable devices, tablet devices, smart home, home appliances, multiprocessor systems, microprocessor based systems, robots, programmable consumer electronics, network personal computers, small computers, large computers, distributed computing environments including any of the systems or devices above, and the like.

Figure 14:
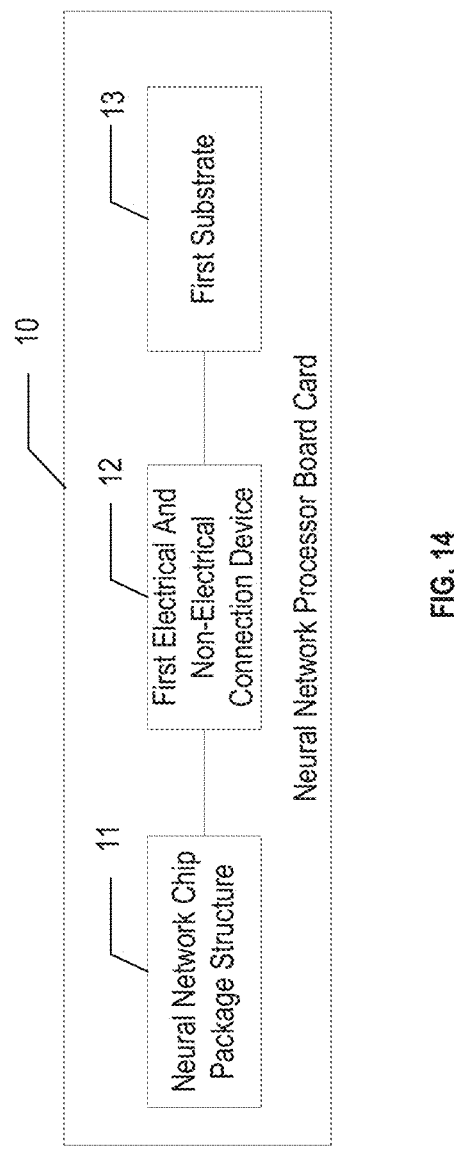
FIG. 14 is a structural diagram of a neural network processor board card according to an example of the present disclosure.
Figure 16:
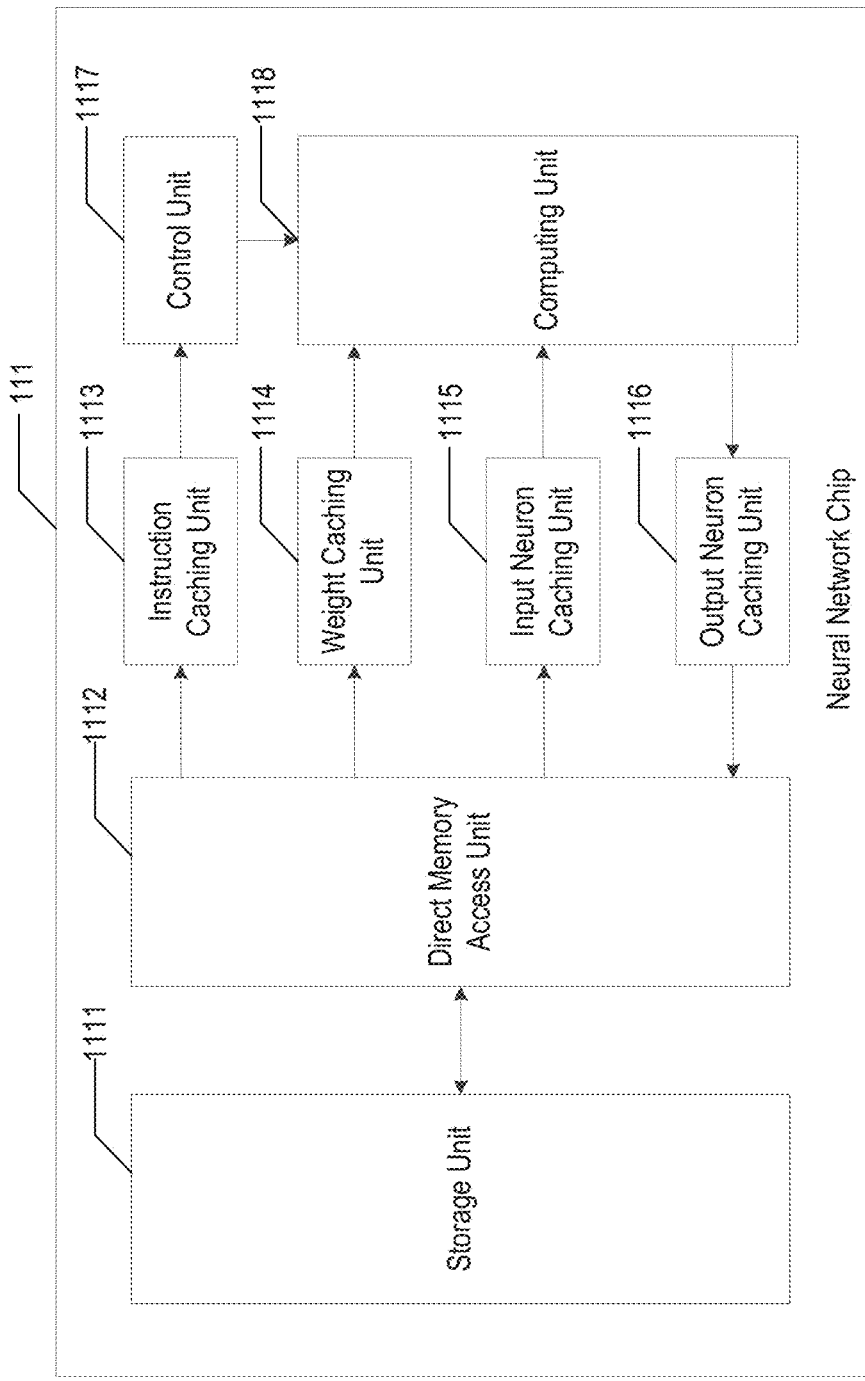
FIG. 16 is a structural diagram of a neural network chip according to an example of the present disclosure.

FIG. 14 is a structural diagram of a neural network processor board card according to an example of the present disclosure. As shown in FIG. 16, the neural network processor board card 10 includes a neural network chip package structure 11, a first electrical and non-electrical connection device 12, and a first substrate 13.

Figure 15:
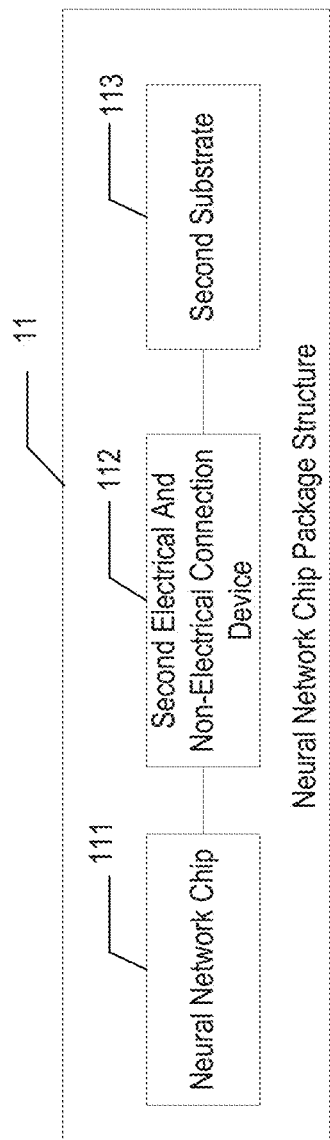
FIG. 15 is a structural diagram of a neural network chip package structure according to an example of the present disclosure.

The present disclosure does not restrict a specific structure of the neural network chip package structure 11. In some embodiments, as shown in FIG. 15, the neural network chip package structure 11 includes a neural network chip 111, a second electrical and non-electrical connection device 112, and a second substrate 113.

The present disclosure does not restrict a specific form of the neural network chip 111. The neural network chip 111 may include but is not limited to a neural network wafer integrated with a neural network processor, where the wafer may be made of silicon material, germanium material, quantum material, or molecular material. The neural network wafer may be packaged according to a real situation (for example, a harsh environment) and different application requirements, so that most of the neural network wafer may be wrapped, and leads on the neural network wafer may be connected to the outside of the packaging structure through conductors such as gold wire, which can be used for circuit connection with an outer layer.

Figure 2:
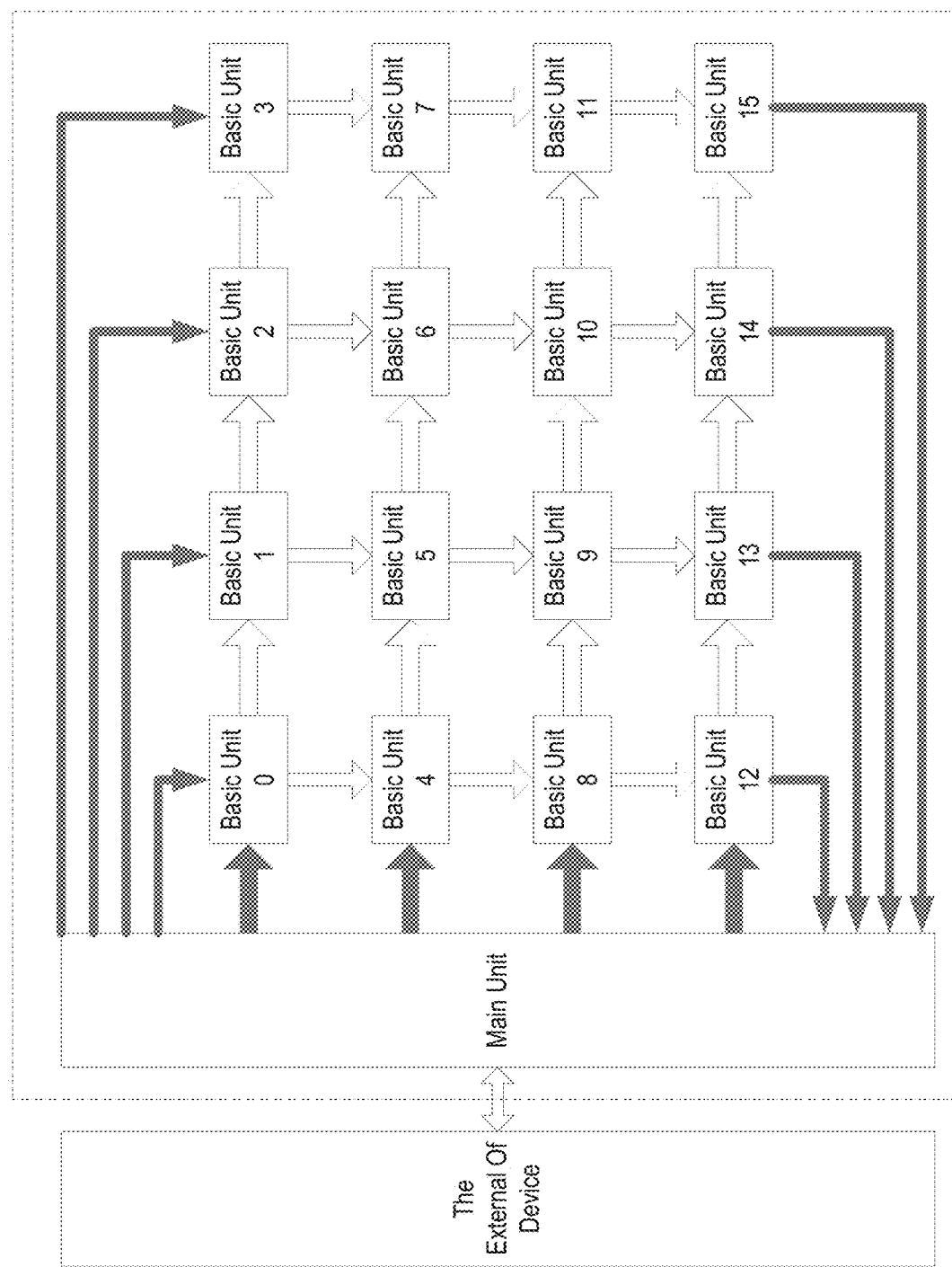
FIG. 2 is a structural diagram of other integrated circuit chip device.

The present disclosure does not restrict a specific structure of the neural network chip 111. Alternatively or additionally, the device shown in FIG. 1 and FIG. 2 may be used as reference.

The present disclosure does not restrict types of the first substrate 13 and the second substrate 113. The first substrate and the second substrate may be a printed circuit board (PCB) or a printed wiring board (PWB), and may also be another type of circuit board. The present disclosure does not restrict the material that the PCB is made of.

The second substrate 113 of the present disclosure may be used to bear the neural network chip 111, and the chip package structure obtained by connecting the neural network chip 111 and the second substrate 113 through the second electrical and non-electrical connection device 112 is used for protecting the neural network chip 111, so that the neural network chip package structure 11 and the first substrate 13 can be further packaged.

The present disclosure does not restrict a specific manner for packaging and a corresponding structure of the manner for packaging of the second electrical and non-electrical connection device 112. An appropriate package manner can be selected and be subject to simple improvement according to a certain situation and different application requirements, such as Flip Chip Ball Grid Array Package (FCBGAP), Low-profile Quad Flat Package (LQFP), Quad Flat Package with Heat Sink (HQFP), Quad Flat Non-lead Package (QFN), or a Fine-Pitch Ball Grid Package (FBGA) and other package manners.

A flip chip may be suitable for a case where the requirement on the area after packaging is high or an inductor of a conductive wire and a transmission time of a signal are sensitive. In addition, a package manner of wire bonding may be adopted to reduce the cost and increase the flexibility of the package structure.

Ball Grid Array may provide more leads, and the average wire length of the leads is short, which can transfer signals at high speed, where the package may be replaced by Pin Grid Array (PGA), Zero Insertion Force (ZIF), Single Edge Contact Connection (SECC), Land Grid Array (LGA), and the like.

Figure 17:
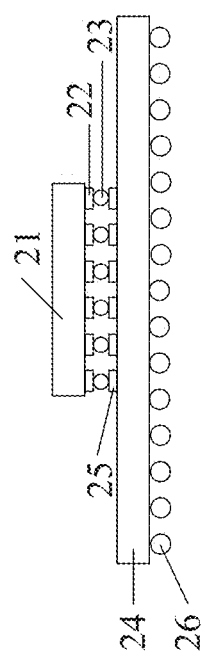
FIG. 17 is a schematic diagram of a neural network chip package structure according to an example of the present disclosure.

In some embodiments, the package manner of Flip Chip Ball Grid Array may be adopted to package the neural network chip 111 and the second substrate 113. Please refer to FIG. 17 for a schematic diagram of a package structure of the neural network chip. As shown in FIG. 17, the neural network chip package structure may include a neural network chip 21, a pad 22, a ball 23, a second substrate 24, a connection point 25 on the second substrate 24, and a lead 26.

The pad 22 is connected to the neural network chip 21, and the ball 23 is formed by welding between the pad 22 and the connection point 25 on the second substrate 24, in this way, the neural network chip 21 and the second substrate 24 is connected, thereby realizing the package of the neural network chip 21.

The lead 26 is used to connect an external circuit of the package structure (for instance, the first substrate 13 on the neural network processor board card 10) for transferring external data and internal data, which may facilitate data processing by the neural network chip 21 or a corresponding neural network processor of the neural network chip 21. A type and quantity of leads are not restricted in the present disclosure. Different lead types can be selected according to different packaging technologies, and leads can be arranged according to certain rules.

In some embodiments, the neural network chip package structure may further include an insulating filler disposed in the gap between the pad 22, the ball 23, and the connection point 25 for preventing interference between balls.

The material of the insulating filler may be silicon nitride, silicon oxide, or silicon oxynitride; and the interference may include electromagnetic interference, inductance interference, and the like.

In some embodiments, the neural network chip package structure may further include a heat dissipation device for dissipating heat generated during the operation of the neural network chip 21. The heat dissipation device may be a piece of metal with good thermal conductivity, a heat sink, or a radiator such as a fan.

Figure 18:
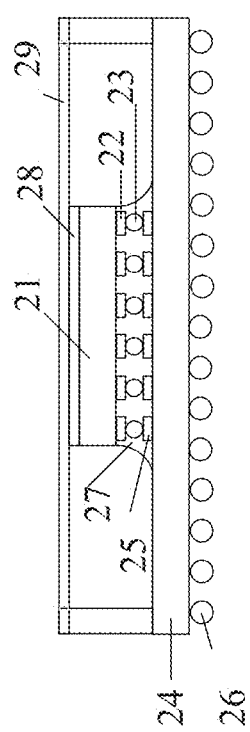
FIG. 18 is a schematic diagram of another neural network chip package structure according to an example of the present disclosure.

For instance, as shown in FIG. 18, the neural network chip package structure 11 may include: a neural network chip 21, a pad 22, a ball 23, a second substrate 24, a connection point 25 on the second substrate 24, a lead 26, an insulating filler 27, thermal compound 28, and a fin 29 with metal housing. Among them, the thermal compound 28 and the fin 29 with metal housing are configured to dissipate the heat generated during the operation of the neural network chip 21.

In some embodiments, the neural network chip package structure 11 may further include a reinforcing structure, which is connected to the pad 22, and is buried in the ball 23 to improve the connection strength between the ball 23 and the pad 22.

The reinforcing structure may be a metal wire structure or a columnar structure, which is not restricted herein.

A specific form of the first electrical and non-electrical device 12 is not restricted in the present disclosure. Please refer to the description of the second electrical and non-electrical device 112. In other words, the neural network chip package structure may be packaged by welding, or by connecting the second substrate 113 and the first substrate 13 through a connecting line or by means of plugging, so that the first substrate 13 or the neural network chip package structure 11 can be replaced conveniently later.

In some embodiments, the first substrate 13 may include a memory unit interface for expanding storage capacity, such as a Synchronous Dynamic Random Access Memory (SDRAM), and a Double Date Rate (DDR) SDRAM, and the like. By expanding the memory, the processing capacity of the neural network processor may be improved.

The first substrate 13 may further include a Peripheral Component Interconnect-Express (PCI-E or PCIe) interface, a Small Form-factor Pluggable (SFP) interface, and an Ethernet interface, a Controller Area Network (CAN) interface, and the like, which can be used for data transfer between the package structure and external circuits. In this way, the computational speed may be improved, and the operation may be easier.

The neural network processor is packaged into a neural network chip 111, the neural network chip 111 is packaged into a chip package structure 11, and the neural network chip package structure 11 is packaged into a neural network processor board card 10. Data interaction with an external circuit (for instance, a computer motherboard) may be performed through an interface (slot or ferrule) on the board card, that is, the function of the neural network processor may be implemented by using the neural network processor board card 10 directly, which may also protect the neural network chip 111. In addition, other modules may be added to the neural network processor board card 10, which may improve the application range and computational efficiency of the neural network processor.

An example of the present disclosure provides an electronic device including the neural network processor board card 10 or the neural network chip package structure 11.

The electronic device includes a data processing device, a robot, a computer, a printer, a scanner, a tablet, a smart terminal, a mobile phone, a traffic recorder, a navigator, a sensor, a webcam, a server, a camera, a video camera, a projector, a watch, a headphone, a mobile storage, a wearable device, a vehicle, a household appliance, and/or a medical equipment.

The vehicle includes an airplane, a ship, and/or a car. The household electrical appliance includes a television, an air conditioner, a microwave oven, a refrigerator, an electric rice cooker, a humidifier, a washing machine, an electric lamp, a gas cooker, and a range hood. The medical equipment includes a nuclear magnetic resonance spectrometer, a B-ultrasonic scanner, and/or an electrocardiograph.

The examples of the present disclosure have been described in detail above. The principles and implementation manners of the present disclosure have been described with the examples. The descriptions of the examples are only used for facilitating understanding of the methods and core ideas of the present disclosure. Persons of ordinary skill in the art may change the implementation and application scope according to the ideas of the present disclosure. In summary, the content of this specification should not be construed as a limitation on the present disclosure.

The invention claimed is:

1. An integrated circuit chip device configured to perform neural network forward computations, wherein the neural network has n layers, the integrated circuit chip device comprising:
   a main processing circuit; and
   a plurality of basic processing circuits,
   wherein:
      the main processing circuit comprises a data type conversion circuit configured to convert data between a floating point data type and a fixed point data type;
      the main processing circuit is configured to:
         receive a first operation instruction;
         parse the first operation instruction to obtain a first computation instruction included in an $i^{th}$ layer of the forward computations of the first operation instruction and corresponding input data and weight data of the first operation instruction, wherein:
            i is an integer greater than or equal to 1 and less than or equal to n, and when i is greater than or equal to 2, the input data is output data of an $(i-1)^{th}$ layer;
         determine a first complexity of the first computation instruction according to the input data, the weight data, and the first computation instruction;
         determine a first data type corresponding to the first computation instruction according to the first complexity; and
         determine whether to start the data type conversion circuit according to the first complexity, wherein: the first data type is a floating point data type or a fixed point data type;
         classify the input data of the first data type and the weight data of the first data type into a broadcasting data block and a distribution data block according to a type of the first computation instruction;
         partition the distribution data block to obtain a plurality of basic data blocks;
         distribute the plurality of basic data blocks to at least one of the plurality of basic processing circuits; and
         broadcast the broadcasting data block to the plurality of basic processing circuits;
      at least one of the plurality of basic processing circuits is configured to:
         perform computations on the broadcasting data block of the first data type and the basic data blocks of the first data type to obtain computation results; and
         transfer the computation results to the main processing circuit; and
      the main processing circuit is further configured to:
         process the computation results to obtain an instruction result of the first computation instruction so that computations of the first computation instruction of the $i^{th}$ layer are completed.

2. The integrated circuit chip device of claim 1, wherein:
   the main processing circuit is configured to compare the first complexity with a preset threshold, wherein:
      when the first complexity is greater than the preset threshold, the main processing circuit is configured to determine the first data type as the fixed point type; and
      when the first complexity is less than or equal to the preset threshold, the main processing circuit is configured to determine the first data type as the floating point type.

3. The integrated circuit chip device of claim 2, wherein:
   the main processing circuit is configured to:
      determine whether the input data and the weight data belong to a second data type, wherein:
         when the second data type differs from the first data type, the main processing circuit is configured to:
            convert the input data belonging to the second data type and the weight data belonging to the second data type into input data belonging to the first data type and weight data belonging to the first data type using the data type conversion circuit.

4. The integrated circuit chip device of claim 1, wherein:
   the main processing circuit is configured to:
      when the first computation instruction is a convolution computation instruction, determine the input data as convolution input data and the weight data as a convolution kernel;
   the first complexity is computed as: the first complexity=$\alpha*C1*kH*kW*M*N*W*C2*H$, wherein, $\alpha$ is a convolution coefficient greater than 1;
   C1, kH, kW, M are values of four dimensions of the convolution kernel; and
   N, W, C2, H are values of four dimensions of the convolution input data;
   when the first complexity is greater than a preset threshold, the main processing circuit is configured to:
      determine whether the convolution input data and the convolution kernel are floating point data, wherein:
         when the convolution input data and the convolution kernel are not floating point data, the main processing circuit is configured to:

convert the convolution input data into floating point data and the convolution kernel into floating point data; and perform the convolution computation on the convolution input data of the floating point type and the convolution kernel of the floating point type.

5. The integrated circuit chip device of claim 1, wherein:
the main processing circuit is configured to:
when the first computation instruction is a matrix-multiply-matrix computation instruction, determine the input data as a first matrix in the matrix-multiply-matrix computation and the weight data as a second matrix in the matrix-multiply-matrix computation;
the first complexity is computed as: the first complexity=$\beta*F*G*E*F1$, wherein:
$\beta$ is a matrix coefficient greater than or equal to 1;
F and G are row and column values of the first matrix; and
E and F1 are row and column values of the second matrix;
when the first complexity is greater than a preset threshold, the main processing circuit is configured to determine whether the first matrix and the second matrix are floating point data, wherein:
when the first matrix and the second matrix are not floating point data, the main processing circuit is configured to:
convert the first matrix into floating point data and the second matrix into floating point data; and
perform the matrix-multiply-matrix computation on the first matrix of the floating point type and the second matrix of the floating point type.

6. The integrated circuit chip device of claim 1, wherein:
the main processing circuit is configured to:
when the first computation instruction is a matrix-multiply-vector computation instruction, determine the input data as a first matrix in the matrix-multiply-vector computation and the weight as a vector in the matrix-multiply-vector computation;
the first complexity is computed as: the first complexity=$\beta*F*G*F1$, wherein:
$\beta$ is a matrix coefficient greater than or equal to 1;
F and G are row and column values of the first matrix; and
F1 is a column value of the vector;
when the first complexity is greater than a preset threshold, the main processing circuit is configured to determine whether the first matrix and the vector are floating point data, wherein:
when the first matrix and the vector are not floating point data, the main processing circuit is configured to:
convert the first matrix and the vector into floating point data; and
perform the matrix-multiply-vector computation on the first matrix and the vector of the floating point data type.

7. The integrated circuit chip device of claim 1, wherein:
the main processing circuit is configured to:
when the first computation instruction is a multiplication instruction, classify the input data into a distribution data block and the weight data into a broadcasting data block; and when the first computation instruction is a convolution instruction, classify the input data into a broadcasting data block and the weight data into a distribution data block.

8. The integrated circuit chip device of claim 1, wherein:
the $i^{th}$ layer further includes at least one of:
a bias operation, a fully connected operation, a GEMM operation, a GEMV operation, or an activation operation.

9. The integrated circuit chip device of claim 1, wherein:
the main processing circuit includes a main register or a main on-chip caching circuit, and
each basic processing circuit includes a basic register or a basic on-chip caching circuit.

10. The integrated circuit chip device of claim 9, wherein:
the main processing circuit includes at least one of:
a vector computing unit circuit, an arithmetic and logic unit circuit, an accumulator circuit, a matrix transposition circuit, a direct memory access circuit, or a data rearrangement circuit.

11. The integrated circuit chip device of claim 9, wherein:
the input data include at least one of:
a vector, a matrix, a three-dimensional data block, or a four-dimensional data block; and
the weight data include at least one of:
a vector, a matrix, a three-dimensional data block, or a four-dimensional data block.

12. A processing device, comprising:
a general interconnection interface;
a general processing device; and
a neural network computing device including at least one integrated circuit chip device;
wherein:
the neural network computing device is connected to the general processing device through the general interconnection interface; and
the at least one integrated circuit chip device is configured to perform neural network forward computations, wherein the neural network has n layers, the at least one integrated circuit chip device comprising:
a main processing circuit; and
a plurality of basic processing circuits,
wherein:
the main processing circuit comprises a data type conversion circuit configured to convert data between a floating point data type and a fixed point data type;
the main processing circuit is configured to:
receive a first operation instruction;
parse the first operation instruction to obtain a first computation instruction included in an $i^{th}$ layer of the forward computations of the first operation instruction and corresponding input data and weight data of the first operation instruction, wherein:
i is an integer greater than or equal to 1 and less than or equal to n, and when i is greater than or equal to 2, the input data is output data of an $(i-1)^{th}$ layer;
the main processing circuit is configured to:
determine a first complexity of the first computation instruction according to the input data, the weight data, and the first computation instruction;

determine a first data type corresponding to the first computation instruction according to the first complexity; and
determine whether to start the data type conversion circuit according to the first complexity, wherein
the first data type is a floating point data type or a fixed point data type;
the main processing circuit is further configured to:
classify the input data of the first data type and the weight data of the first data type into a broadcasting data block and a distribution data block according to a type of the first computation instruction;
partition the distribution data block to obtain a plurality of basic data blocks;
distribute the plurality of basic data blocks to at least one of the plurality of basic processing circuits; and
broadcast the broadcasting data block to the plurality of basic processing circuits;
at least one of the plurality of basic processing circuits is configured to:
perform computations on the broadcasting data block of the first data type and the basic data blocks of the first data type to obtain computation results; and
transfer the computation results to the main processing circuit; and
the main processing circuit is configured to:
process the computation results to obtain an instruction result of the first computation instruction so that computations of the first computation instruction of the $i^{th}$ layer are completed.

13. A method, implemented by an integrated circuit chip device comprising a plurality of basic processing circuits and a main processing circuit that includes a data type conversion circuit configured to convert data between a floating point data type and a fixed point data type, for performing neural network forward computations, the method comprising:
receiving, by the main processing circuit, a first operation instruction;
parsing, by the main processing circuit, the first operation instruction to obtain a first computation instruction included in an $i^{th}$ layer of the forward computations of the first operation instruction and corresponding input data and weight data of the first operation instruction, wherein:
i is an integer greater than or equal to 1 and less than or equal to n, and when i is greater than or equal to 2, the input data is output data of an $(i-1)^{th}$ layer;
determining, by the main processing circuit, a first complexity of the first computation instruction according to the input data, the weight data, and the first computation instruction;
determining, by the main processing circuit, a first data type corresponding to the first computation instruction according to the first complexity; and
determining, by the main processing circuit, whether to start the data type conversion circuit according to the first complexity, wherein:
the first data type is a floating point data type or a fixed point data type;
classifying, by the main processing circuit, the input data of the first data type and the weight data of the first data type into a broadcasting data block and a distribution data block according to a type of the first computation instruction;
partitioning, by the main processing circuit, the distribution data block to obtain a plurality of basic data blocks;
distributing, by the main processing circuit, the plurality of basic data blocks to at least one of the plurality of basic processing circuits; and
broadcasting, by the main processing circuit, the broadcasting data block to the plurality of basic processing circuits;
performing, by at least one of the plurality of basic processing circuits, computations on the broadcasting data block of the first data type and the basic data blocks of the first data type to obtain computation results;
transferring, by at least one of the plurality of basic processing circuits, the computation results to the main processing circuit; and
processing, by the main processing circuit, the computation results to obtain an instruction result of the first computation instruction so that computations of the first computation instruction of the $i^{th}$ layer are completed.

14. The method of claim 13, further comprising:
comparing, by the main processing circuit, the first complexity with a preset threshold;
determining, by the main processing circuit, the first data type as the fixed point type when the first complexity is greater than the preset threshold; and
determining, by the main processing circuit, the first data type as the floating point type when the first complexity is less than or equal to the preset threshold.

15. The method of claim 14, further comprising:
determining, by the main processing circuit, whether the input data and the weight data belong to a second data type, wherein when the second data type differs from the first data type:
converting, by the main processing circuit, the input data belonging to the second data type and the weight data belonging to the second data type into input data belonging to the first data type and weight data belonging to the first data type using the data type conversion circuit.

16. The method of claim 13, further comprising:
when the first computation instruction is a convolution computation instruction, determining, by the main processing circuit, the input data as convolution input data and the weight data as a convolution kernel;
wherein the first complexity is computed as: the first complexity=$\alpha*C1*kH*kW*M*N*W*C2*H$, wherein, $\alpha$ is a convolution coefficient greater than 1;
C1, kH, kW, M are values of four dimensions of the convolution kernel; and
N, W, C2, H are values of four dimensions of the convolution input data;
when the first complexity is greater than a preset threshold:
determining, by the main processing circuit, whether the convolution input data and the convolution kernel are floating point data, wherein:
when the convolution input data and the convolution kernel are not floating point data:
converting, by the main processing circuit, the convolution input data into floating point data and the convolution kernel into floating point data; and performing, by the main processing circuit, the convolution computation on the convolution input data of the floating point type and the convolution kernel of the floating point type.

17. The method of claim 13, further comprising:
when the first computation instruction is a matrix-multiply-matrix computation instruction, determining, by the main processing circuit, the input data as a first matrix in the matrix-multiply-matrix computation and the weight data as a second matrix in the matrix-multiply-matrix computation;
wherein the first complexity is computed as: the first complexity=$\beta*F*G*E*F1$, wherein:
$\beta$ is a matrix coefficient greater than or equal to 1;
F and G are row and column values of the first matrix; and
E and F1 are row and column values of the second matrix;
when the first complexity is greater than a preset threshold, determining, by the main processing circuit, whether the first matrix and the second matrix are floating point data, wherein:
when the first matrix and the second matrix are not floating point data:
converting, by the main processing circuit, the first matrix into floating point data and the second matrix into floating point data; and
performing, by the main processing circuit, the matrix-multiply-matrix computation on the first matrix of the floating point type and the second matrix of the floating point type.

18. The method of claim 13, further comprising:
when the first computation instruction is a matrix-multiply-vector computation instruction, determining, by the main processing circuit, the input data as a first matrix in the matrix-multiply-vector computation and the weight as a vector in the matrix-multiply-vector computation;
wherein the first complexity is computed as: the first complexity=$\beta*F*G*F1$, wherein:
$\beta$ is a matrix coefficient greater than or equal to 1;
F and G are row and column values of the first matrix; and
F1 is a column value of the vector;
when the first complexity is greater than a preset threshold, determining, by the main processing circuit, whether the first matrix and the vector are floating point data, wherein:
when the first matrix and the vector are not floating point data:
converting, by the main processing circuit, the first matrix and the vector into floating point data; and
performing, by the main processing circuit, the matrix-multiply-vector computation on the first matrix and the vector of the floating point data type.

19. The method of claim 13, further comprising:
when the first computation instruction is a multiplication instruction, classifying, by the main processing circuit, the input data into a distribution data block and the weight data into a broadcasting data block; and
when the first computation instruction is a convolution instruction, classifying, by the main processing circuit, the input data into a broadcasting data block and the weight data into a distribution data block.

20. The method of claim 13, wherein:
the $i^{th}$ layer further includes at least one of:
a bias operation, a fully connected operation, a GEMM operation, a GEMV operation, or an activation operation.

* * * * *